US012621314B2

(12) United States Patent
Baker et al.

(10) Patent No.: US 12,621,314 B2
(45) Date of Patent: May 5, 2026

(54) DNS RECURSIVE PTR SIGNALS ANALYSIS

(71) Applicant: Oracle International Corporation, Redwood Shores, CA (US)

(72) Inventors: Christopher Robert Baker, Salem, NH (US); Peter Martin Hanily, Newbridge (IE); Ryan Daniel Schilcher, Issaquah, WA (US); Jonathan Philip Taimanglo, Alexandria, VA (US)

(73) Assignee: Oracle International Corporation, Redwood Shores, CA (US)

( * ) Notice: Subject to any disclaimer, the term of this patent is extended or adjusted under 35 U.S.C. 154(b) by 48 days.

(21) Appl. No.: 18/367,938

(22) Filed: Sep. 13, 2023

(65) Prior Publication Data

US 2023/0420147 A1    Dec. 28, 2023

(51) Int. Cl.
*H04L 9/40* (2022.01)
(52) U.S. Cl.
CPC ............................... *H04L 63/1416* (2013.01)
(58) Field of Classification Search
None
See application file for complete search history.

(56) References Cited

U.S. PATENT DOCUMENTS

| | | | | | |
|---|---|---|---|---|---|
| 2016/0359887 A1* | 12/2016 | Yadav | ................. | H04L 63/1425 |
| 2017/0041333 A1 | 2/2017 | Mahjoub et al. | | |
| 2018/0351976 A1* | 12/2018 | Shitrit-Efergan | ... | H04L 63/1425 |
| 2019/0306188 A1* | 10/2019 | Medvedovsky | .... | H04L 63/1425 |
| 2020/0106790 A1* | 4/2020 | Bagnall | ............... | H04L 63/1416 |

| | | | | | |
|---|---|---|---|---|---|
| 2021/0194903 A1* | 6/2021 | Medvedovsky | .... | H04L 63/1416 |
| 2021/0344690 A1* | 11/2021 | Sharifi Mehr | ...... | H04L 63/1416 |
| 2022/0353286 A1* | 11/2022 | Bazalgette | .............. | G06F 21/36 |
| 2024/0163309 A1* | 5/2024 | Aviv | .................... | H04L 63/1425 |
| 2024/0348643 A1* | 10/2024 | Davis | .................. | H04L 63/0263 |
| 2025/0132983 A1* | 4/2025 | Aslam | ................. | H04L 61/4511 |

OTHER PUBLICATIONS

International Application No. PCT/US2024/042453 , International Search Report and Written Opinion, Mailed On Oct. 17, 2024, 12 pages.
Roberts et al., "Watching the Watchers: Nonce-based Inverse Surveillance to Remotely Detect Monitoring", Available online at: https://arxiv.org/abs/2005.07641, Jun. 5, 2020, 9 pages.

* cited by examiner

*Primary Examiner* — Joshua Joo
(74) *Attorney, Agent, or Firm* — Kilpatrick Townsend & Stockton LLP

(57) ABSTRACT

Cyber-security techniques are described for monitoring a cloud environment and identifying potential problems, including malicious threats, to the monitored cloud environment using operational telemetry. Techniques are described for monitoring and collecting data related to reverse or recursive DNS (rDNS) traffic associated with a monitored cloud environment. The recursive DNS traffic includes recursive DNS (rDNS) requests originating from the cloud environment and responses to those requests received from DNS resolvers. This collected data is then analyzed to identify potential threats to the monitored cloud environment. The collected data may be analyzed to identify potential sources of threats and to identify one or more portions of the cloud environment that are the targets of the threats. The analysis may trigger alerts to be generated, actions to be performed (e.g., protective measures), reports to be generated, patterns to be recognized, etc.

20 Claims, 19 Drawing Sheets

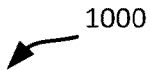

1000

---

1002

Use augmented data collected over a period of time to generate a baseline for the monitored environment

↓

1004

Use augmented data collected for the monitored environment to identify a deviation from the baseline

↓

1006

Flag the deviation identified in 1004 as irregular activity associated with the monitored environment

↓

1008

Take one or more actions responsive to the identification of the flagged activity in 1006

Figure 11:
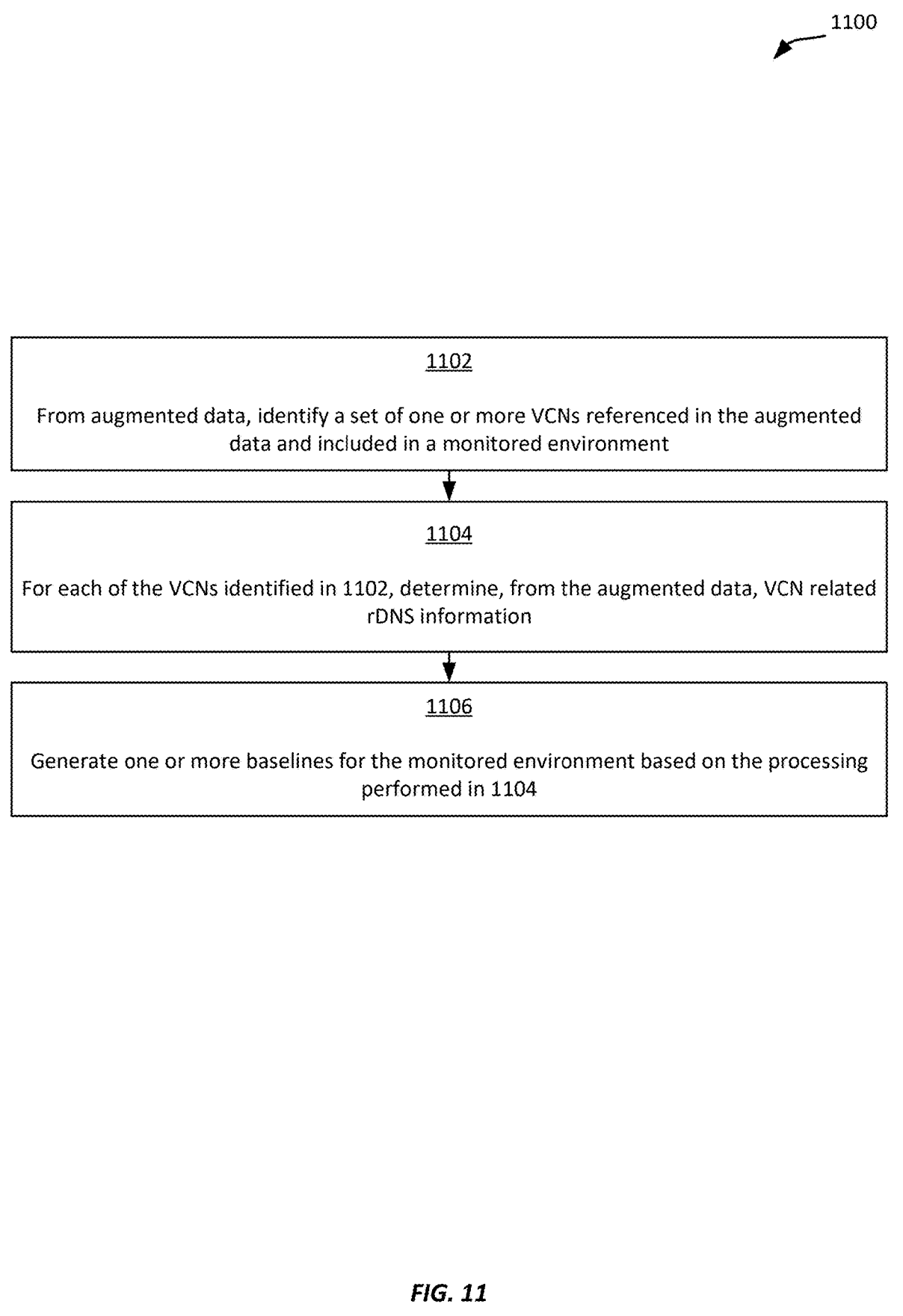

From augmented data, identify a set of one or more VCNs referenced in the augmented data and included in a monitored environment

---

1104

For each of the VCNs identified in 1102, determine, from the augmented data, VCN related rDNS information

---

1106

Generate one or more baselines for the monitored environment based on the processing performed in 1104

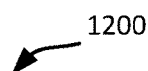

1200

1202
Obtain augmented data generated for the monitored environment (e.g., region) over a period of time

1204
Perform for each VCN (target) in the monitored environment (scope):

1206
From the augmented data, determine a number of rDNS requests originating from the VCN over the period of time

1208
Compare the information determined in 1208 to the baseline (for the target)

1210
Determine based on the comparison performed in 1210 whether an irregularity exists

1212
Irregularity Exists?

No

Yes

1214
Output a signal identifying the irregularity

1216
initiate one or more action in response to the irregularity detection

*FIG. 12*

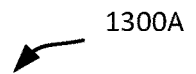

1300A

---

1302
Obtain any IP address-level baseline thresholds for rDNS requests configured for the monitored environment (scope)

---

1304
Obtain any FQDN-level baseline thresholds for rDNS requests configured for the monitored environment (scope)

---

1306
Obtain any owner-level baseline thresholds for rDNS requests configured for the monitored environment (scope)

---

1308
Obtain augmented data generated for a monitored environment for a period of time

---

1310
From augmented data, identify a set of one or more IP addresses that are involved in one or more rDNS requests

---

1312
Identify a set of one or more FQDNs corresponding to the IP addresses identified in step 1310

---

1314
Identify a set of one or more owners corresponding to the FQDNs identified in step 1312

---

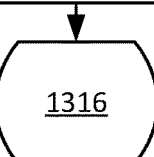

DNS RECURSIVE PTR SIGNALS ANALYSIS

BACKGROUND

The adoption of cloud services has seen a meteoric rise in the last few years. This has resulted in a growing number of cloud services providers (CSPs) offering one or more cloud services to subscribing customers. In a typical scenario, a CSP provides a cloud environment comprising CSP-provided infrastructure that is used for providing one or more services offered by the CSP to its customers. The cloud environment can include networked compute resources, memory resources, networking resources, software resources, and other types of resources that are used for provision of the cloud services. The cloud environment typically comprises a physical network layer (referred to as a substrate layer) on top of which one or more virtual networks are supported and used to provide the cloud services.

Due to their distributed nature and complexity, CSP-provided cloud environments are highly vulnerable to malicious cyber-attacks. For a CSP, being able to protect the CSP's cloud environment from cyber-attacks unleashed by bad actors is of utmost importance. This is important for protecting the data and other customer resources that customers have entrusted to the CSP. Bad publicity arising from security breaches can ruin a CSP's business. CSPs are thus always on the lookout for new and innovative ways to better protect their cloud environments.

SUMMARY

The present disclosure relates to cyber-security techniques, and more particularly to techniques for monitoring a cloud environment and identifying potential problems, including malicious threats, to the monitored cloud environment using operational telemetry. In certain implementations, techniques are described for monitoring and collecting data related to reverse or recursive DNS (rDNS) traffic associated with a monitored cloud environment. The recursive DNS traffic includes recursive DNS (rDNS) requests originating from the cloud environment and responses to those requests received from DNS resolvers. This collected data is then analyzed to identify potential threats to the monitored cloud environment. The collected data may be analyzed to identify potential sources of threats and to identify one or more portions of the cloud environment that are the targets of the threats.

The present disclosure relates to monitoring DNS recursive resolver traffic, specifically PTR record resolutions. Through such monitoring, the regions, VCNs, and/or host machines associated with each rDNS request can be tracked to establish how many regions, VCNs, and/or host machines attempted to resolve each PTR record. After collecting data, the observations can be aggregated, analyzed, and/or stored for subsequent use. Analysis of rDNS request and response data may include determining systems being targeted by irregular activity (e.g., malicious actors, abnormal activity) and/or determining what and/or who is the cause of the irregular activity. As a result of the analysis, alerts may be generated, actions performed (e.g., protective measures), reports generated, patterns recognized, etc. Various embodiments are described herein, including methods, systems, non-transitory computer-readable storage media storing programs, code, or instructions executable by one or more processors, and the like. Some embodiments may be implemented by using a computer program product, comprising computer program/instructions which, when executed by a processor, cause the processor to perform any of the methods described in the disclosure.

In certain implementations, techniques (e.g., methods, systems, computer readable mediums) comprise monitoring, by a cloud defense system, reverse DNS traffic associated with a monitored environment, the reverse DNS traffic comprising a set of one or more reverse DNS resolver requests originating from the monitored environment and a set of one or more responses generated by one or more DNS resolvers in response to the set of one or more reverse DNS resolver requests. The techniques may further comprise monitoring, by the cloud defense system, one or more responses to the set of one or more reverse DNS resolver requests. The techniques may further comprise collecting, by the cloud defense system, and storing raw data based upon the monitoring of the reverse DNS traffic, augmenting, by the cloud defense system, the raw data to generate augmented data, and identifying, by the cloud defense system, using the augmented data, an irregular network activity associated with the monitored environment. The techniques may further comprise outputting, by the cloud defense system, a signal indicative of the irregular network activity.

In certain implementations, identifying the irregular network activity comprises identifying a portion of the monitored environment that is experiencing the irregular network activity, the portion of the monitored environment comprising one or more components of the monitored environment. In certain implementations, the one or more components of the monitored environment include at least one of: a virtual cloud network (VCN) within the monitored environment, a region within the monitored environment, a set of one or more VCNs associated with a customer of a cloud service provider, a data center within the monitored environment, a virtual machine and a host machine.

In certain implementations, identifying the irregular network activity comprises identifying a source of the irregular network activity. In certain implementations, the source is a portion of the monitored environment. In certain implementations, the source is a component external to the monitored environment.

In certain implementations, identifying the source comprises performing identifying at least one of: a first IP address associated with the source that triggered at least one reverse DNS request in the set of one or more reverse DNS resolver requests, a first fully qualified domain name (FQDN) associated with the first IP address, or an owner associated with the first FQDN.

In certain implementations, the techniques further comprise initiating, by the cloud defense system, a set of one or more actions responsive to outputting the signal indicative of the irregular network activity. In certain implementations, the set of one or more actions at least perform one of the following: (i) changing a set of rules associated with a component of the cloud defense system, (ii) quarantining a system within a cloud server provider infrastructure (CSPI), and (iii) causing an alert to be generated. In certain implementations, wherein the alert is a report and the alert is sent to a user of the cloud defense system or a customer of the CSPI.

In certain implementations, identifying the irregular network activity comprises generating a first baseline using prior augmented data, the prior augmented data generated prior to generating the first baseline, determining a deviation from the first baseline, and identifying the deviation as the irregular network activity. In certain implementations, the first baseline identifies a portion of the monitored environment and a first threshold associated with the portion of the monitored environment, and determining the deviation comprises determining, based upon the augmented data, that the first threshold associated with the portion has been exceeded. In certain implementations, the first baseline represents a number of rDNS requests within the set of one or more rDNS resolver requests transmitted by the portion of the monitored environment. In certain implementations, the first baseline represents a number of rDNS requests within the set of one or more rDNS resolver requests transmitted by the portion of the monitored environment to resolve a set of one or more IP addresses. In certain implementations, the first baseline is different from a second baseline identifying a second portion of the monitored environment with a second threshold that is different from the first threshold.

In certain implementations, the set of one or more reverse DNS resolver requests are generated by one or more VCNs, one or more regions, or one or more virtual machines.

In certain implementations, the raw data and an outside data source is used when generating the augmented data.

The foregoing, together with other features and embodiments will become more apparent upon referring to the following specification, claims, and accompanying drawings.

FIGURES

FIG. 10 depicts a simplified flow diagram for monitoring a monitored environment to determine a baseline network activity and determine actions to perform if irregular activity is identified, according to some embodiments.

FIG. 11 depicts a simplified flow diagram for determining a baseline rDNS request volume for a monitored environment, according to some embodiments.

FIG. 12 depicts a simplified flow diagram for detecting irregular network behavior for a monitored environment, according to some embodiments.

FIGS. 13A-13B depict a simplified flow diagram for detecting malicious actors using a cloud defense system, according to some embodiments.

DETAILED DESCRIPTION

Figure 1:
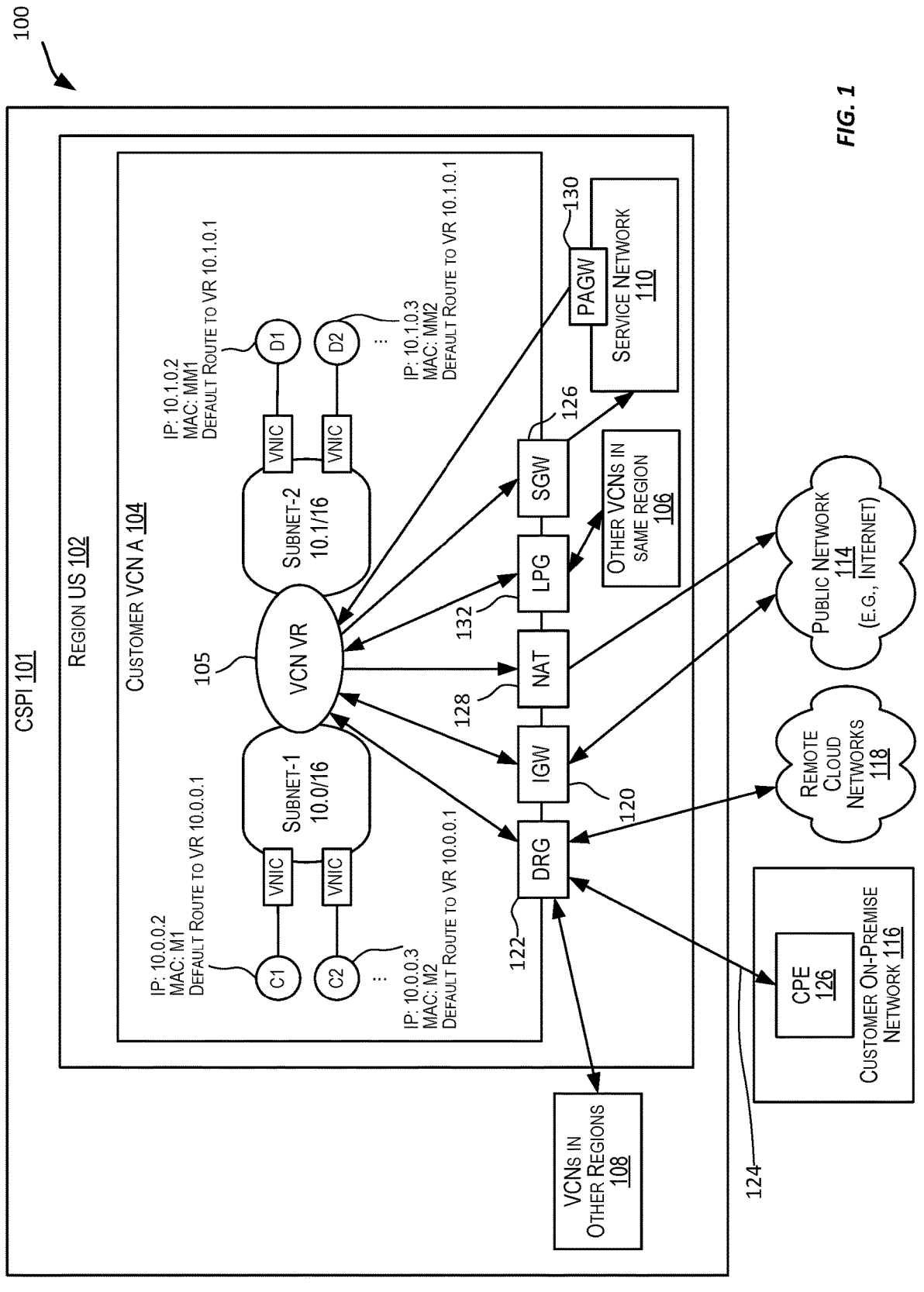
FIG. 1 is a high level diagram of a distributed environment showing a virtual or overlay cloud network hosted by a cloud service provider infrastructure according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to cyber-security techniques, and more particularly to techniques for monitoring a cloud environment and identifying potential problems, including malicious threats, to the monitored cloud environment using operational telemetry. In certain implementations, techniques are described for monitoring and collecting data related to reverse or recursive DNS (rDNS) traffic associated with a monitored cloud environment. The recursive DNS traffic includes recursive DNS (rDNS) requests originating from the cloud environment and responses to those requests received from DNS resolvers. This collected data is then analyzed to identify potential threats to the monitored cloud environment. The collected data may be analyzed to identify potential sources of threats and to identify one or more portions of the cloud environment that are the targets of the threats.

In certain implementations, a cloud defense system is provided that is configured to monitor and collect data related to rDNS requests originating from a cloud environment and corresponding responses generated by DNS resolvers. The cloud defense system is configured to augment the collected raw data with additional data obtained from one or more additional data sources to generate augmented data. The cloud defense system then uses the augmented data to identify portions of the monitored cloud environment that are behaving abnormally and thus may potentially be the targets of malicious attacks. In certain implementations, the cloud defense system uses the augmented data to generate a baseline for the monitored cloud environment over a period of time. In certain implementations, multiple different baselines may be generated for different portions of the monitored cloud environment. The cloud defense system then identifies deviations from a baseline and identifies those portions of the monitored cloud environment experiencing the deviations as potential targets of malicious attacks.

In certain implementations, the cloud defense system also uses the augmented data to identify sources of threats to the monitored cloud environment. For example, certain IP addresses that cause an abnormally high volume of rDNS traffic may be identified as potential bad actors. The sources of threats can be located outside the monitored cloud environment or inside the monitored cloud environment. In certain implementations, multiple different baselines may be generated for sources sending traffic to the monitored cloud environment. The cloud defense system then identifies deviations from such baselines and may identify those sources associated with the deviations as potential sources of malicious attacks.

The cloud defense system reduces false positive identifications of threats. For example, various normal activities may result in rDNS requests. Examples include scanning performed by a source. In some instances, the scanning may be performed by a valid source (e.g., scanning performed by a trusted system (e.g., an internal network security team) to identify system vulnerabilities) whereas in some other instances it may be performed by malware looking to propagate to multiple host machines or servers and/or virtual machines. By using baselines that have been generated over a period of time, and using those baselines to find deviations, the cloud defense system described herein is capable of identifying activity that is a real threat from other normal activities. In this manner, the cloud defense system reduces the occurrences of false positives.

The cloud defense system collects rDNS traffic-related data for the monitored environment and further augments the collected data using additional data sources. The augmented information provides a contextual view into the state of the monitored environment which facilitates a more accurate identification of portions of the monitored environment that are potentially under attack and/or sources potentially maliciously attacking at least a portion of the monitored environment. Based on the context, the cloud defense system is capable of identifying the intentions behind data communications with the monitored environment and differentiate malicious activity from normal baseline activity. This increases the overall efficiency and usability of the cloud defense system In addition to efficiency being increased by reducing false positives, efficiency may also be increased by removing noise from network traffic data (filtering network traffic data) before it is processed, thereby decreasing the time and resources required to process the filtered network traffic data compared to the unfiltered network traffic data.

When abnormal activity is identified, either when a portion of the monitored cloud environment is identified as experiencing abnormal behavior or when a particular source is identified as the source of abnormal behavior experienced by a portion of the monitored cloud environment, the cloud defense system may cause one or more actions to be initiated. For example, one or more actions may be initiated to isolate the portion of the cloud environment experiencing the abnormal behavior, to contain the abnormal activity withing a portion of the cloud environment, to rectify the cyber breach or threat, and the like. These actions may include, for example, setting up firewalls, taking a host machine offline, setting up a list of IP addresses or FQDNs to be blocked, quarantining a particular VCN or set of VCNs, etc.

The cloud defense system is configured to collect and store rDNS traffic-related data for different levels of hierarchy of the monitored cloud environment. For example, in certain embodiments, the cloud defense system collects the rDNS traffic data at the per virtual cloud network (VCN)-level, where a VCN can be executed by one or more host machines. The cloud defense system monitors rDNS requests emanating from VCNs within the monitored cloud environment and the corresponding DNS resolver responses. Data collected at the VCN-level can be used to identify irregular behavior at the VCN-level. For VCNs in a data center, data collected for the VCNs can be aggregated to represent data for the data center. Data center-level aggregated data can be used to identify irregular network activity at the data center level. For one or more data centers in a region, data for the data centers collected can be aggregated to represent data for the region. The region-level aggregated data can be used to identify irregular network activity at the region level. For a global area comprising one or more regions, the data collected for regions can be aggregated to represent data for the global area. Global area level aggregated data can be used to identify irregular network activity at the global area level. In this manner, the cloud defense system is able to collect, aggregate, and analyze rDNS traffic data collected for different hierarchical architecture levels of a monitored cloud environment. The collected data can also be used to monitor irregular activity on a per customer level, where a customer can be associated with one or more VCNs.

In certain embodiments, the cloud defense system may include multiple systems including a traffic monitoring system, a data augmentation system, a data analysis system, a report generator system, and a query system. A traffic monitoring system may monitor and collect data related to rDNS traffic associated with a monitored cloud environment. The monitored rDNS traffic may include rDNS requests originating from the monitored cloud environment and corresponding responses received from one or more DNS resolvers. The monitoring and collection may be performed at different hierarchical levels of the cloud environment including for VCNs, customers, data centers, regions, global area, and the like.

In certain implementations, a data augmentation system is responsible for augmenting the raw data collected by the traffic monitoring system to generate augmented data. There are various ways in which the raw data may be augmented to generate the augmented data. In certain use cases, the data augmentation system may augment the raw data using data obtained from one or more data sources, including external third part data sources.

In certain implementations, the data analysis system is responsible for analyzing the augmented data and outputting analysis results. The data may be analyzed along different dimensions and parameters. For example, the data analysis system may analyze the augmented data to determine baseline information for a monitored cloud environment. For example, the baseline may identify how many rDNS requests originate from the monitored cloud environment for a certain IP address under normal working circumstances. The baseline information may include information related to one or multiple parameters such as the number of rDNS requests and/or responses related to a particular IP, related to a particular fully qualified domain name (FQDN), related to a particular owner of one or more FQDNs, etc. The baseline information may identify one or more thresholds related to these different parameters. The data analysis system may then identify and track deviations from the baseline behavior. When a deviation from the baseline behavior is beyond a pre-established threshold, that deviation may be flagged by the data analysis system as irregular behavior. The data analysis system may identify a portion of the monitored cloud environment (e.g., a particular VCN, a group of VCNs, a particular customer, a data center, a region, etc.) experiencing the irregular behavior. The data analysis system may also identify a source (e.g., a particular IP address, an FQDN, an entity, etc.) responsible for causing or triggering the abnormal behavior. In certain embodiments, the data analysis system is capable of identifying and evaluating, using the augmented data, whether one or more patterns exist in the collected data and the augmented data. A deviation from a normal pattern may be identified as abnormal and potentially malicious behavior.

In some embodiments, upon detecting abnormal behavior, the data analysis system may send a signal to downstream systems that act upon the signal received from the data analysis system. For example, the data analysis system may send a signal indicative of abnormal behavior to a downstream alerts system, which may, in response, generate one or more alerts. The alerts may be associated with different severity levels based upon the information contained in the signal received from the data analysis system. In certain implementations, the alerts system may be configured with rules and/or machine learning models, that the system uses to determine what alerts to generate, when an alert is to be generated, the contents of the alert, the recipients of the alerts, the communication channels to be used for delivering the alerts to their intended recipients, and the like.

As another example, the data analysis system may send a signal indicative of abnormal behavior to a downstream actions system, which may, in response, initiate one or more actions. These actions, may include actions to mitigate or isolate the target or source of the abnormal behavior, preventative actions, corrective actions, and the like. In certain implementations, the actions system may be configured with rules and/or machine learning models, that the system uses to determine what actions to initiate, when an action is to be initiated, the target of the action (e.g., which VCN, host machine, etc.), and the like. Examples of actions include: quarantining a VCN from interacting with other systems in the monitored cloud environment, disconnecting a particular host machine from the network, setting up firewalls, and other actions.

As yet another example, the data analysis system may send a signal indicative of abnormal behavior to a report generation system, which may, in response, generate one or more reports and send the reports to pre-configured recipients. In certain implementations, the report generator system may be configured with rules and/or machine learning models, that the system uses to determine what reports to generate, when the reports are to be generated, the contents of the reports, the recipients of the reports, the communication channels to be used for delivering the reports to their intended recipients, and the like.

In certain embodiments, the cloud defense system may provide a query system that enables users of the cloud defense system to query the raw and/or augmented data and run their own analysis of the data. The query system may support different types of queries such as SQL queries, natural language queries, and the like. Examples of queries include a query to: identify all instances of reverse DNS requests generated for a particular IP for a region over a particular time period; the number of rDNS requests originating from a particular VCN over a particular period of time; all FQDN involved in rDNS requests over a certain threshold volume over a particular period of time; etc. The query system enables users of the cloud defense system to obtain relevant information from the collected and augmented data, to run their own analyses, etc.

Embodiments described herein are capable of leveraging analysis of rDNS requests and responses to classify network activities in a monitored cloud environment and perform processing that may lead to attributions of root causes of incidents, and the intentions surrounding such incidents to be better understood.

The present disclosure describes novel solutions for protecting a cloud environment from malicious attacks using techniques that monitor, collect, and analyze data related to rDNS traffic associated with the cloud environment. Since the data is collected at the VCN level, the identity of the host machines running on the VCN, which may be associated with customers of cloud services, is not made available to the cloud defense system. This is important for many customers of cloud services who prefer information about their payload to be kept private.

The various solutions described in this disclosure provide novel ways for protecting a cloud environment using data collected from monitoring rDNS requests and/or responses. Certain embodiments may reduce the processing time of analyzing network activity and may increase the accuracy of detecting irregular network activity (e.g., malicious network activity, abnormal network activity). Through the recognition of irregular network activity, the uptime of the network and systems thereof may be increased as well as their data having increased protection from threats. In some embodiments, certain network traffic may be blocked as a result of actions taken by the cloud defense system and therefor allow for enhanced connectivity with the systems of the cloud service provider infrastructure.

Furthermore, irregular activity identified using the scale of the cloud defense system may be relayed to customers or users of the cloud infrastructure so that they may obtain similar benefits.

Example Virtual Networking Architecture

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The physical network (or substrate network or underlay network) comprises physical network devices such as physical switches, routers, computers and host machines, and the like. An overlay network is a logical (or virtual) network that runs on top of a physical substrate network. A given physical network can support one or multiple overlay networks. Overlay networks typically use encapsulation techniques to differentiate between traffic belonging to different overlay networks. A virtual or overlay network is also referred to as a virtual cloud network (VCN). The virtual networks are implemented using software virtualization technologies (e.g., hypervisors, virtualization functions implemented by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN-IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual or overlay networks. A physical IP address is an IP address associated with a physical device (e.g., a network device) in the substrate or physical network. For example, each NVD has an associated physical IP address. An overlay IP address is an overlay address associated with an entity in an overlay network, such as with a compute instance in a customer's virtual cloud network (VCN). Two different customers or tenants, each with their own private VCNs can potentially use the same overlay IP address in their VCNs without any knowledge of each other. Both the physical IP addresses and overlay IP addresses are types of real IP addresses. These are separate from virtual IP addresses. A virtual IP address is typically a single IP address that is represents or maps to multiple real IP addresses. A virtual IP address provides a 1-to-many mapping between the virtual IP address and multiple real IP addresses. For example, a load balancer may use a VIP to map to or represent multiple servers, each server having its own real IP address.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general. a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such certain embodiments, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming secure shell (SSH) traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane. The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 14, 15, 16, and 17 (see references 1616, 1716, 1816, and 1916) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Various different architectures for implementing cloud-based service using CSPI are depicted in FIGS. 1, 2, 3, 4, 5, 14, 15, 16, and 17, and are described below. FIG. 1 is a high level diagram of a distributed environment 100 showing an overlay or customer VCN hosted by CSPI according to certain embodiments. The distributed environment depicted in FIG. 1 includes multiple components in the overlay network. Distributed environment 100 depicted in FIG. 1 is merely an example and is not intended to unduly limit the scope of claimed embodiments. Many variations, alternatives, and modifications are possible. For example, in some implementations, the distributed environment depicted in FIG. 1 may have more or fewer systems or components than those shown in FIG. 1, may combine two or more systems, or may have a different configuration or arrangement of systems.

As shown in the example depicted in FIG. 1, distributed environment 100 comprises CSPI 101 that provides services and resources that customers can subscribe to and use to build their virtual cloud networks (VCNs). In certain embodiments, CSPI 101 offers IaaS services to subscribing customers. The data centers within CSPI 101 may be organized into one or more regions. One example region "Region US" 102 is shown in FIG. 1. A customer has configured a customer VCN 104 for region 102. The customer may deploy various compute instances on VCN 104, where the compute instances may include virtual machines or bare metal instances. Examples of instances include applications, database, load balancers, and the like.

In the embodiment depicted in FIG. 1, customer VCN 104 comprises two subnets, namely, "Subnet-1" and "Subnet-2", each subnet with its own CIDR IP address range. In FIG. 1, the overlay IP address range for Subnet-1 is 10.0/16 and the address range for Subnet-2 is 10.1/16. A VCN Virtual Router 105 represents a logical gateway for the VCN that enables communications between subnets of the VCN 104, and with other endpoints outside the VCN. VCN VR 105 is configured to route traffic between VNICs in VCN 104 and gateways associated with VCN 104. VCN VR 105 provides a port for each subnet of VCN 104. For example, VR 105 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 101. A compute instance participates in a subnet via a VNIC associated with the compute instance. For example, as shown in FIG. 1, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 1, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 105 using IP address 10.0.0.1, which is the IP address for a port of VCN VR 105 for Subnet-1.

Subnet-2 can have multiple compute instances deployed on it, including virtual machine instances and/or bare metal instances. For example, as shown in FIG. 1, compute instances D1 and D2 are part of Subnet-2 via VNICs associated with the respective compute instances. In the embodiment depicted in FIG. 1, compute instance D1 has an overlay IP address of 10.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 105 using IP address 10.1.0.1, which is the IP address for a port of VCN VR 105 for Subnet-2.

VCN A 104 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 104 can communicate with various different endpoints. These endpoints may include endpoints that are hosted by CSPI 200 and endpoints outside CSPI 200. Endpoints that are hosted by CSPI 101 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 106 or 110, communications between a compute instance in Subnet-1 and an endpoint in service network 110 in the same region); or an endpoint in a VCN in a different region (e.g., communications between a compute instance in Subnet-1 and an endpoint in a VCN in a different region 108). A compute instance in a subnet hosted by CSPI 101 may also communicate with endpoints that are not hosted by CSPI 101 (i.e., are outside CSPI 101). These outside endpoints include endpoints in the customer's on-premise network 116, endpoints within other remote cloud hosted networks 118, public endpoints 114 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 1 wants to send a packet to compute instance D1 in Subnet-2, the packet is first processed by the VNIC associated with compute instance C1. The VNIC associated with compute instance C1 is configured to route the packet to the VCN VR 105 using default route or port 10.0.0.1 of the VCN VR. VCN VR 105 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 104 to an endpoint that is outside VCN 104, the communication is facilitated by the VNIC associated with the source compute instance, VCN VR 105, and gateways associated with VCN 104. One or more types of gateways may be associated with VCN 104. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 104. The packet may be first processed by the VNIC associated with source compute instance C1. The VNIC processing determines that the destination for the packet is outside the Subnet-1 of C1. The VNIC associated with C1 may forward the packet to VCN VR 105 for VCN 104. VCN VR 105 then processes the packet and as part of the processing, based upon the destination for the packet, determines a particular gateway associated with VCN 104 as the next hop for the packet. VCN VR 105 may then forward the packet to the particular identified gateway. For example, if the destination is an endpoint within the customer's on-premise network, then the packet may be forwarded by VCN VR 105 to Dynamic Routing Gateway (DRG) gateway 122 configured for VCN 104. The packet may then be forwarded from the gateway to a next hop to facilitate communication of the packet to it final intended destination.

Various different types of gateways may be configured for a VCN. Examples of gateways that may be configured for a VCN are depicted in FIG. 1 and described below. Examples of gateways associated with a VCN are also depicted in FIGS. 14, 15, 16, and 17 (for example, gateways referenced by reference numbers 1634, 1636, 1638, 1734, 1736, 1738, 1834, 1836, 1838, 1934, 1936, and 1938) and described below. As shown in the embodiment depicted in FIG. 1, a Dynamic Routing Gateway (DRG) 122 may be added to or be associated with customer VCN 104 and provides a path for private network traffic communication between customer VCN 104 and another endpoint, where the another endpoint can be the customer's on-premise network 116, a VCN 108 in a different region of CSPI 101, or other remote cloud networks 118 not hosted by CSPI 101. Customer on-premise network 116 may be a customer network or a customer data center built using the customer's resources. Access to customer on-premise network 116 is generally very restricted. For a customer that has both a customer on-premise network 116 and one or more VCNs 104 deployed or hosted in the cloud by CSPI 101, the customer may want their on-premise network 116 and their cloud-based VCN 104 to be able to communicate with each other. This enables a customer to build an extended hybrid environment encompassing the customer's VCN 104 hosted by CSPI 101 and their on-premises network 116. DRG 122 enables this communication. To enable such communications, a communication channel 124 is set up where one endpoint of the channel is in customer on-premise network 116 and the other endpoint is in CSPI 101 and connected to customer VCN 104. Communication channel 124 can be over public communication networks such as the Internet or private communication networks. Various different communication protocols may be used such as IPsec VPN technology over a public communication network such as the Internet, Oracle's Fast-Connect technology that uses a private network instead of a public network, and others. The device or equipment in customer on-premise network 116 that forms one end point for communication channel 124 is referred to as the customer premise equipment (CPE), such as CPE 126 depicted in FIG. 1. On the CSPI 101 side, the endpoint may be a host machine executing DRG 122.

In certain embodiments, a Remote Peering Connection (RPC) can be added to a DRG, which allows a customer to peer one VCN with another VCN in a different region. Using such an RPC, customer VCN 104 can use DRG 122 to connect with a VCN 108 in another region. DRG 122 may also be used to communicate with other remote cloud networks 118, not hosted by CSPI 101 such as a Microsoft Azure cloud, Amazon AWS cloud, and others.

As shown in FIG. 1, an Internet Gateway (IGW) 120 may be configured for customer VCN 104 the enables a compute instance on VCN 104 to communicate with public endpoints 114 accessible over a public network such as the Internet. IGW 120 is a gateway that connects a VCN to a public network such as the Internet. IGW 120 enables a public subnet (where the resources in the public subnet have public overlay IP addresses) within a VCN, such as VCN 104, direct access to public endpoints 112 on a public network 114 such as the Internet. Using IGW 120, connections can be initiated from a subnet within VCN 104 or from the Internet.

A Network Address Translation (NAT) gateway 128 can be configured for customer's VCN 104 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 104, with private access to public endpoints on the Internet. In NAT gateways, connections can be initiated only from the private subnet to the public Internet and not from the Internet to the private subnet.

In certain embodiments, a Service Gateway (SGW) 126 can be configured for customer VCN 104 and provides a path for private network traffic between VCN 104 and supported services endpoints in a service network 110. In certain embodiments, service network 110 may be provided by the CSP and may provide various services. An example of such a service network is Oracle's Services Network, which provides various services that can be used by customers. For example, a compute instance (e.g., a database system) in a private subnet of customer VCN 104 can back up data to a service endpoint (e.g., Object Storage) without needing public IP addresses or access to the Internet. In certain embodiments, a VCN can have only one SGW, and connections can only be initiated from a subnet within the VCN and not from service network 110. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 126 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 132 is a gateway that can be added to customer VCN 104 and enables VCN 104 to peer with another VCN in the same region. Peering means that the VCNs communicate using private IP addresses, without the traffic traversing a public network such as the Internet or without routing the traffic through the customer's on-premises network 116. In preferred embodiments, a VCN has a separate LPG for each peering it establishes. Local Peering or VCN Peering is a common practice used to establish network connectivity between different applications or infrastructure management functions.

Service providers, such as providers of services in service network 110, may provide access to services using different access models. According to a public access model, services may be exposed as public endpoints that are publicly accessible by compute instance in a customer VCN via a public network such as the Internet and or may be privately accessible via SGW 126. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 130 is a gateway resource that can be attached to a service provider VCN (e.g., a VCN in service network 110) that acts as an ingress/egress point for all traffic from/to customer subnet private endpoints. PAGW 130 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 130 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 132 and the PE in the customer's VCN.

A customer can control routing in a VCN at the subnet level, so the customer can specify which subnets in the customer's VCN, such as VCN 104, use each gateway. A VCN's route tables are used to decide if traffic is allowed out of a VCN through a particular gateway. For example, in a particular instance, a route table for a public subnet within customer VCN 104 may send non-local traffic through IGW 120. The route table for a private subnet within the same customer VCN 104 may send traffic destined for CSP services through SGW 126. All remaining traffic may be sent via the NAT gateway 128. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 104) can be categorized as public access, private access, or dedicated access. Public access refers to an access model where a public IP address or a NAT is used to access a public endpoint. Private access enables customer workloads in VCN 104 with private IP addresses (e.g., resources in a private subnet) to access services without traversing a public network such as the Internet. In certain embodiments, CSPI 101 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 2:
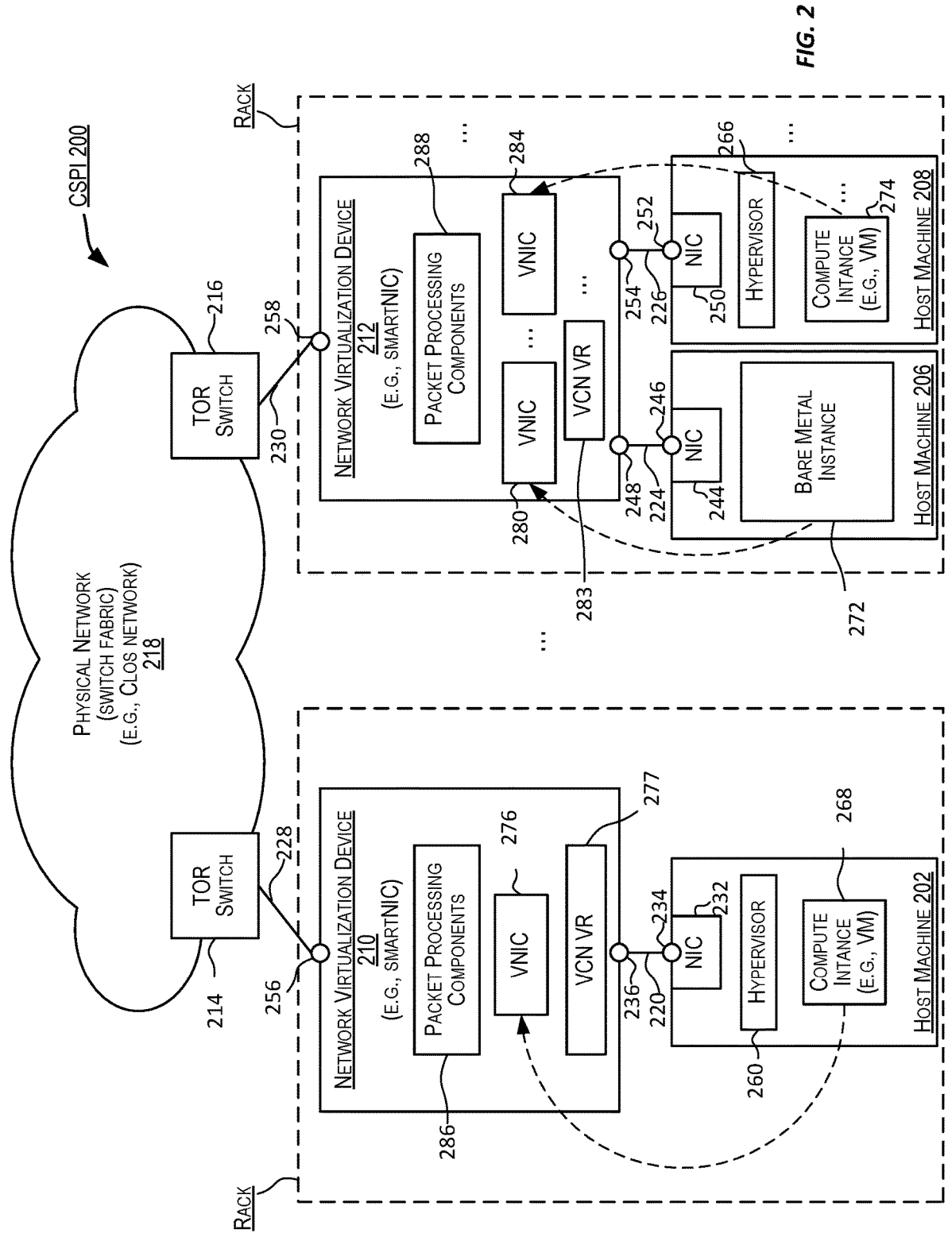
FIG. 2 depicts a simplified architectural diagram of the physical components in the physical network within CSPI according to certain embodiments.

FIG. 1 and the accompanying description above describes various virtualized components in an example virtual network. As described above, the virtual network is built on the underlying physical or substrate network. FIG. 2 depicts a simplified architectural diagram of the physical components in the physical network within CSPI 200 that provide the underlay for the virtual network according to certain embodiments. As shown, CSPI 200 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 200 are provisioned for the customer. Customers can then build their own cloud-based (i.e., CSPI-hosted) customizable and private virtual networks using physical compute, memory, and networking resources provided by CSPI 200. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 200 provides infrastructure and a set of complementary cloud services that enable customers to build and run a wide range of applications and services in a highly available hosted environment.

In the example embodiment depicted in FIG. 2, the physical components of CSPI 200 include one or more physical host machines or physical servers (e.g., 202, 206, 208), network virtualization devices (NVDs) (e.g., 210, 212), top-of-rack (TOR) switches (e.g., 214, 216), and a physical network (e.g., 218), and switches in physical network 218. The physical host machines or servers may host and execute various compute instances that participate in one or more subnets of a VCN. The compute instances may include virtual machine instances, and bare metal instances. For example, the various compute instances depicted in FIG. 1 may be hosted by the physical host machines depicted in FIG. 2. The virtual machine compute instances in a VCN may be executed by one host machine or by multiple different host machines. The physical host machines may also host virtual host machines, container-based hosts or functions, and the like. The VNICs and VCN VR depicted in FIG. 1 may be executed by the NVDs depicted in FIG. 2. The gateways depicted in FIG. 1 may be executed by the host machines and/or by the NVDs depicted in FIG. 2.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 2, host machines 202 and 208 execute hypervisors 260 and 266, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 2, hypervisor 260 may sit on top of the OS of host machine 202 and enables the computing resources (e.g., processing, memory, and networking resources) of host machine 202 to be shared between compute instances (e.g., virtual machines) executed by host machine 202. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 2 may have the same or different types of hypervisors.

A compute instance can be a virtual machine instance or a bare metal instance. In FIG. 2, compute instances 268 on host machine 202 and 274 on host machine 208 are examples of virtual machine instances. Host machine 206 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 2, host machine 202 executes a virtual machine compute instance 268 that is associated with VNIC 276, and VNIC 276 is executed by NVD 210 connected to host machine 202. As another example, bare metal instance 272 hosted by host machine 206 is associated with VNIC 280 that is executed by NVD 212 connected to host machine 206. As yet another example, VNIC 284 is associated with compute instance 274 executed by host machine 208, and VNIC 284 is executed by NVD 212 connected to host machine 208.

For compute instances hosted by a host machine, an NVD connected to that host machine also executes VCN VRs corresponding to VCNs of which the compute instances are members. For example, in the embodiment depicted in FIG. 2, NVD 210 executes VCN VR 277 corresponding to the VCN of which compute instance 268 is a member. NVD 212 may also execute one or more VCN VRs 283 corresponding to VCNs corresponding to the compute instances hosted by host machines 206 and 208.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 2, host machine 202 is connected to NVD 210 using link 220 that extends between a port 234 provided by a NIC 232 of host machine 202 and between a port 236 of NVD 210. Host machine 206 is connected to NVD 212 using link 224 that extends between a port 246 provided by a NIC 244 of host machine 206 and between a port 248 of NVD 212. Host machine 208 is connected to NVD 212 using link 226 that extends between a port 252 provided by a NIC 250 of host machine 208 and between a port 254 of NVD 212.

The NVDs are in turn connected via communication links to top-of-the-rack (TOR) switches, which are connected to physical network 218 (also referred to as the switch fabric). In certain embodiments, the links between a host machine and an NVD, and between an NVD and a TOR switch are Ethernet links. For example, in FIG. 2, NVDs 210 and 212 are connected to TOR switches 214 and 216, respectively, using links 228 and 230. In certain embodiments, the links 220, 224, 226, 228, and 230 are Ethernet links. The collection of host machines and NVDs that are connected to a TOR is sometimes referred to as a rack.

Figure 5:
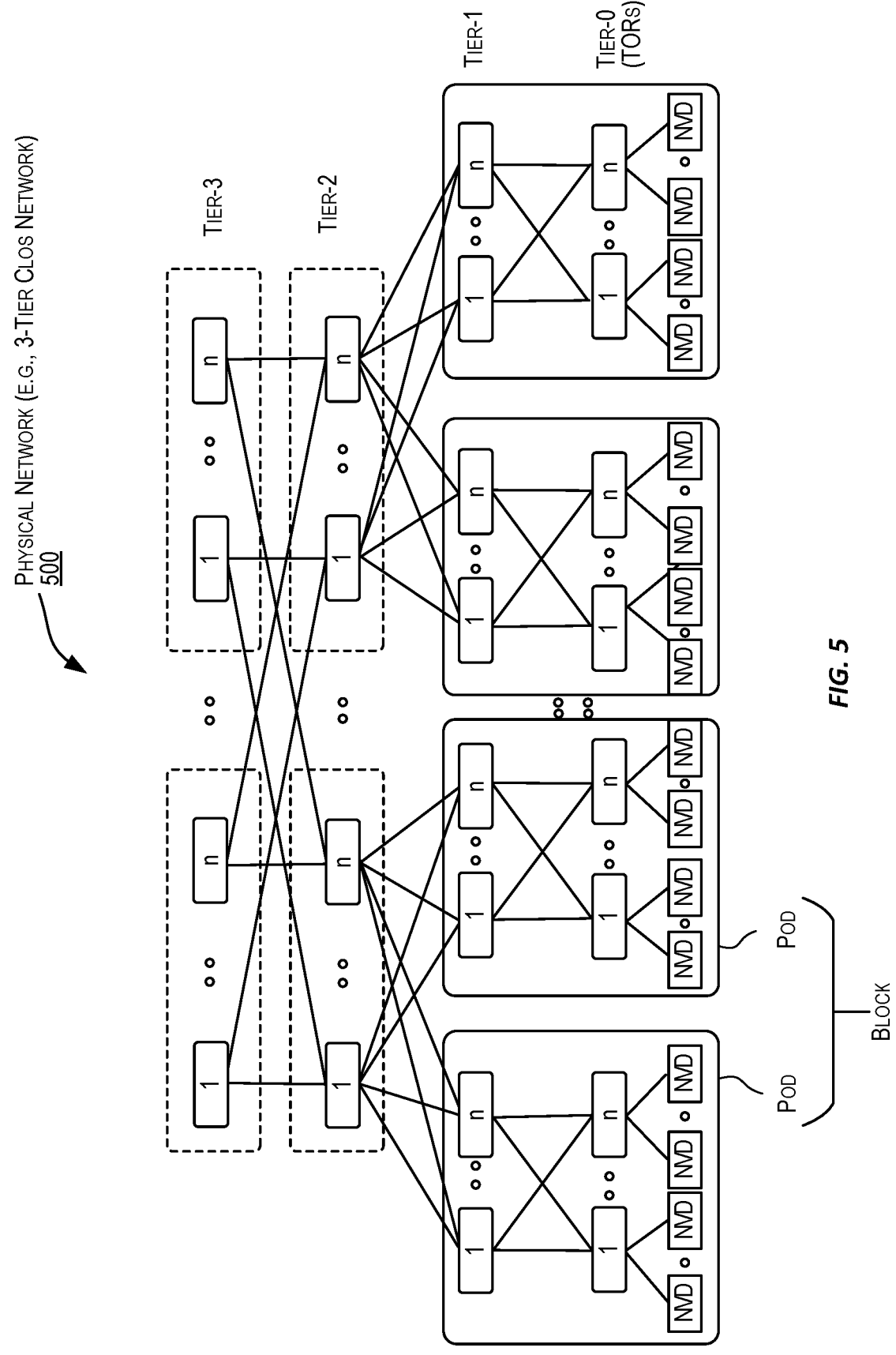
FIG. 5 depicts a simplified block diagram of a physical network provided by a CSPI according to certain embodiments.

Physical network 218 provides a communication fabric that enables TOR switches to communicate with each other. Physical network 218 can be a multi-tiered network. In certain implementations, physical network 218 is a multi-tiered Clos network of switches, with TOR switches 214 and 216 representing the leaf level nodes of the multi-tiered and multi-node physical switching network 218. Different Clos network configurations are possible including but not limited to a 2-tier network, a 3-tier network, a 4-tier network, a 5-tier network, and in general a "n"-tiered network. An example of a Clos network is depicted in FIG. 5 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 2, host machine 202 is connected to NVD 210 via NIC 232 of host machine 202. In a many-to-one configuration, multiple host machines are connected to one NVD. For example, in FIG. 2, host machines 206 and 208 are connected to the same NVD 212 via NICs 244 and 250, respectively.

Figure 3:
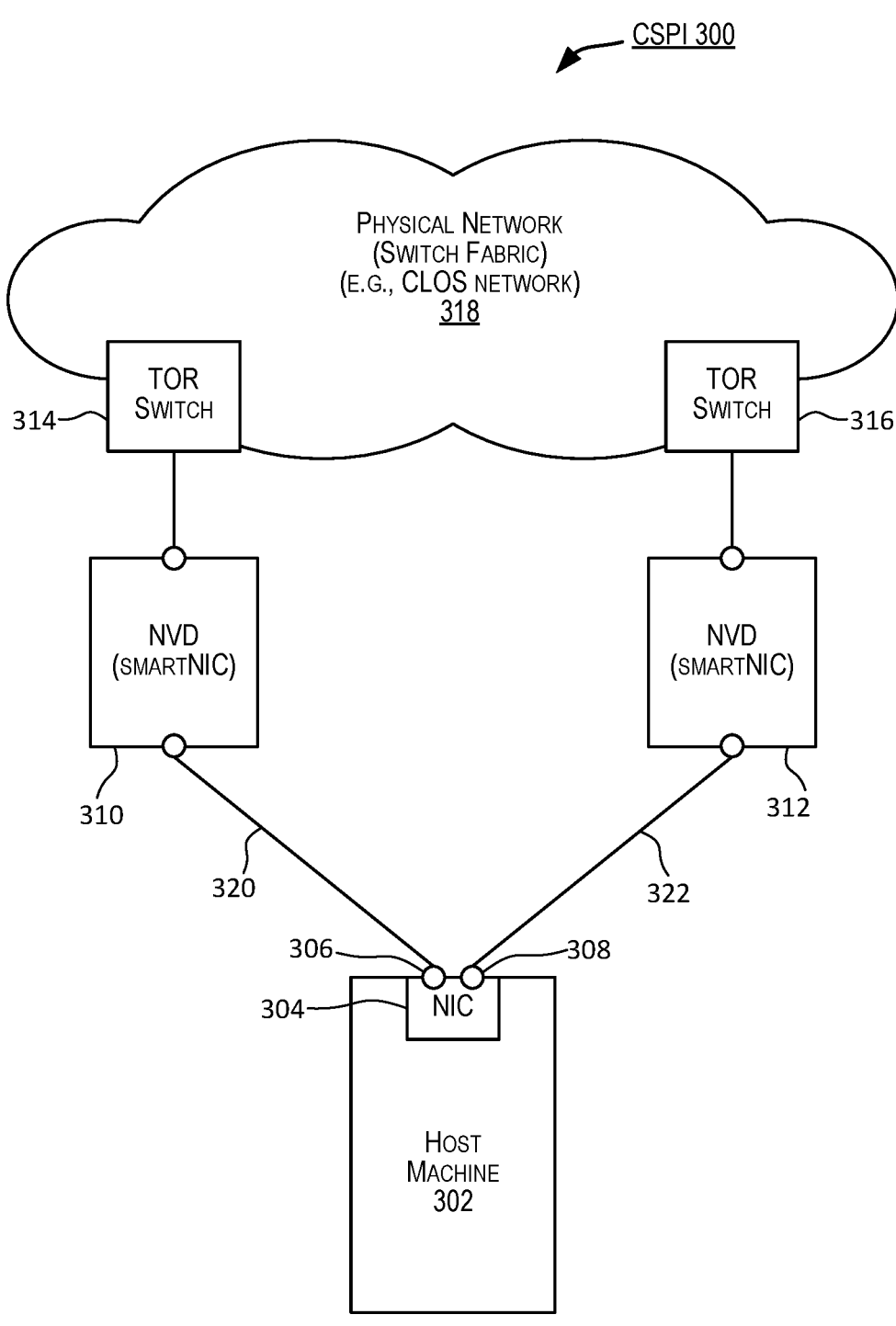
FIG. 3 shows an example arrangement within CSPI where a host machine is connected to multiple network virtualization devices (NVDs) according to certain embodiments.

In a one-to-many configuration, one host machine is connected to multiple NVDs. FIG. 3 shows an example within CSPI 300 where a host machine is connected to multiple NVDs. As shown in FIG. 3, host machine 302 comprises a network interface card (NIC) 304 that includes multiple ports 306 and 308. Host machine 300 is connected to a first NVD 310 via port 306 and link 320, and connected to a second NVD 312 via port 308 and link 322. Ports 306 and 308 may be Ethernet ports and the links 320 and 322 between host machine 302 and NVDs 310 and 312 may be Ethernet links. NVD 310 is in turn connected to a first TOR switch 314 and NVD 312 is connected to a second TOR switch 316. The links between NVDs 310 and 312, and TOR switches 314 and 316 may be Ethernet links. TOR switches 314 and 316 represent the Tier-0 switching devices in multi-tiered physical network 318.

The arrangement depicted in FIG. 3 provides two separate physical network paths to and from physical switch network 318 to host machine 302: a first path traversing TOR switch 314 to NVD 310 to host machine 302, and a second path traversing TOR switch 316 to NVD 312 to host machine 302. The separate paths provide for enhanced availability (referred to as high availability) of host machine 302. If there are problems in one of the paths (e.g., a link in one of the paths goes down) or devices (e.g., a particular NVD is not functioning), then the other path may be used for communications to/from host machine 302.

In the configuration depicted in FIG. 3, the host machine is connected to two different NVDs using two different ports provided by a NIC of the host machine. In other embodiments, a host machine may include multiple NICs that enable connectivity of the host machine to multiple NVDs.

Referring back to FIG. 2, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 2, the NVDs 210 and 212 may be implemented as smartNICs that are connected to host machines 202, and host machines 206 and 208, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 200. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 2, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 2 include port 236 on NVD 210, and ports 248 and 254 on NVD 212. A network-facing port of an NVD is a port that is used to connect the NVD to a TOR switch. Examples of network-facing ports in FIG. 2 include port 256 on NVD 210, and port 258 on NVD 212. As shown in FIG. 2, NVD 210 is connected to TOR switch 214 using link 228 that extends from port 256 of NVD 210 to the TOR switch 214. Likewise, NVD 212 is connected to TOR switch 216 using link 230 that extends from port 258 of NVD 212 to the TOR switch 216.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with compute instances in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 14, 15, 16, and 17 (see references 1616, 1716, 1816, and 1916) and described below. Examples of a VCN Data Plane are depicted in FIGS. 14, 15, 16, and 17 (see references 1618, 1718, 1818, and 1918) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 2, NVD 210 executes the functionality for VNIC 276 that is associated with compute instance 268 hosted by host machine 202 connected to NVD 210. As another example, NVD 212 executes VNIC 280 that is associated with bare metal compute instance 272 hosted by host machine 206, and executes VNIC 284 that is associated with compute instance 274 hosted by host machine 208. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 2, NVD 210 executes VCN VR 277 corresponding to the VCN to which compute instance 268 belongs. NVD 212 executes one or more VCN VRs 283 corresponding to one or more VCNs to which compute instances hosted by host machines 206 and 208 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 2. For example, NVD 210 comprises packet processing components 286 and NVD 212 comprises packet processing components 288. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 1 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 1 may be executed or hosted by one or more of the physical components depicted in FIG. 2. For example, the compute instances in a VCN may be executed or hosted by one or more host machines depicted in FIG. 2. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 2, a packet originating from compute instance 268 may be communicated from host machine 202 to NVD 210 over link 220 (using NIC 232). On NVD 210, VNIC 276 is invoked since it is the VNIC associated with source compute instance 268. VNIC 276 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 200 and endpoints outside CSPI 200. Endpoints hosted by CSPI 200 may include instances in the same VCN or other VCNs, which may be the customer's VCNs, or VCNs not belonging to the customer. Communications between endpoints hosted by CSPI 200 may be performed over physical network 218. A compute instance may also communicate with endpoints that are not hosted by CSPI 200, or are outside CSPI 200. Examples of these endpoints include endpoints within a customer's on-premise network or data center, or public endpoints accessible over a public network such as the Internet. Communications with endpoints outside CSPI 200 may be performed over public networks (e.g., the Internet) (not shown in FIG. 2) or private networks (not shown in FIG. 2) using various communication protocols.

The architecture of CSPI 200 depicted in FIG. 2 is merely an example and is not intended to be limiting. Variations, alternatives, and modifications are possible in alternative embodiments. For example, in some implementations, CSPI 200 may have more or fewer systems or components than those shown in FIG. 2, may combine two or more systems, or may have a different configuration or arrangement of systems. The systems, subsystems, and other components depicted in FIG. 2 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 4:
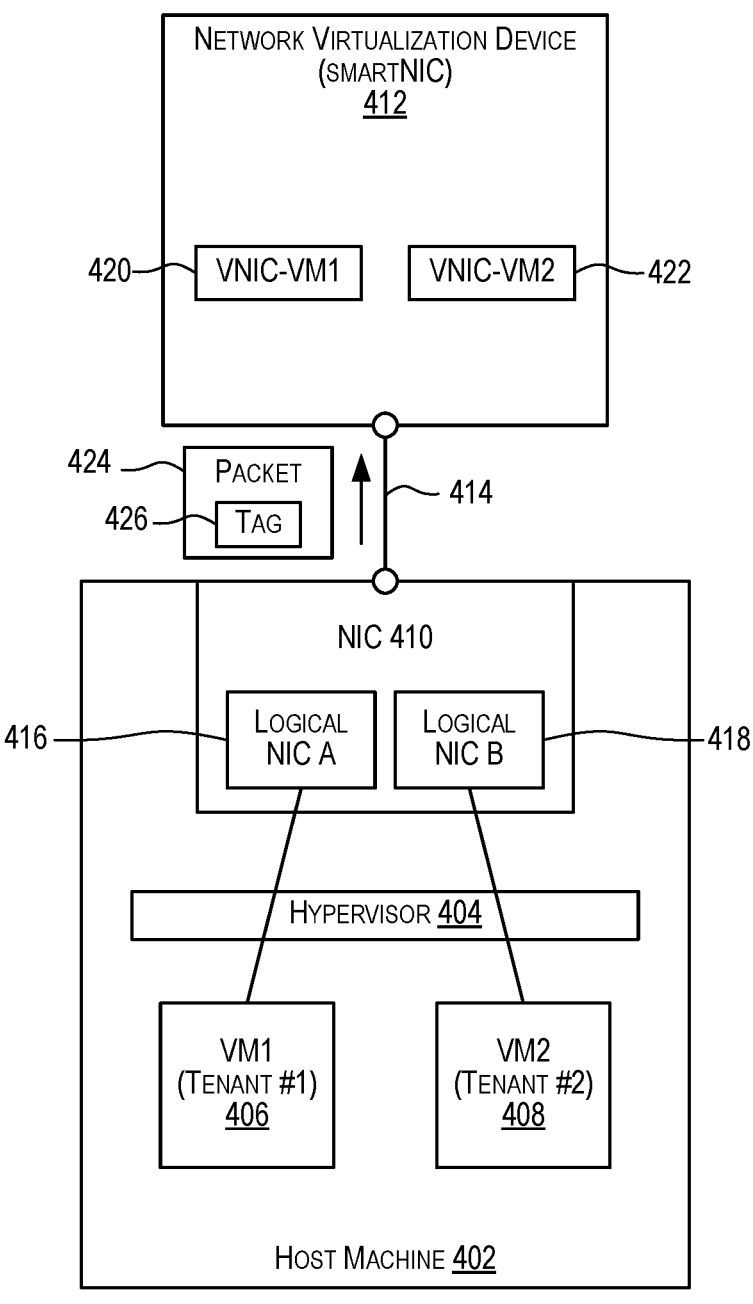
FIG. 4 depicts connectivity between a host machine and an NVD for providing I/O virtualization for supporting multitenancy according to certain embodiments.

FIG. 4 depicts connectivity between a host machine and an NVD for providing I/O virtualization for supporting multitenancy according to certain embodiments. As depicted in FIG. 4, host machine 402 executes a hypervisor 404 that provides a virtualized environment. Host machine 402 executes two virtual machine instances, VM1 406 belonging to customer/tenant #1 and VM2 408 belonging to customer/tenant #2. Host machine 402 comprises a physical NIC 410 that is connected to an NVD 412 via link 414. Each of the compute instances is attached to a VNIC that is executed by NVD 412. In the embodiment in FIG. 4, VM1 406 is attached to VNIC-VM1 420 and VM2 408 is attached to VNIC-VM2 422.

As shown in FIG. 4, NIC 410 comprises two logical NICs, logical NIC A 416 and logical NIC B 418. Each virtual machine is attached to and configured to work with its own logical NIC. For example, VM1 406 is attached to logical NIC A 416 and VM2 408 is attached to logical NIC B 418. Even though host machine 402 comprises only one physical NIC 410 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 416 for Tenant #1 and a separate VLAN ID is assigned to logical NIC B 418 for Tenant #2. When a packet is communicated from VM1 406, a tag assigned to Tenant #1 is attached to the packet by the hypervisor and the packet is then communicated from host machine 402 to NVD 412 over link 414. In a similar manner, when a packet is communicated from VM2 408, a tag assigned to Tenant #2 is attached to the packet by the hypervisor and the packet is then communicated from host machine 402 to NVD 412 over link 414. Accordingly, a packet 424 communicated from host machine 402 to NVD 412 has an associated tag 426 that identifies a specific tenant and associated VM. On the NVD, for a packet 424 received from host machine 402, the tag 426 associated with the packet is used to determine whether the packet is to be processed by VNIC-VM1 420 or by VNIC-VM2 422. The packet is then processed by the corresponding VNIC. The configuration depicted in FIG. 4 enables each tenant's compute instance to believe that they own their own host machine and NIC. The setup depicted in FIG. 4 provides for I/O virtualization for supporting multi-tenancy.

FIG. 5 depicts a simplified block diagram of a physical network 500 according to certain embodiments. The embodiment depicted in FIG. 5 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 5 is a 3-tiered network comprising tiers 1, 2, and 3. The TOR switches 504 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 5, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 500 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID). This identifier is included as part of the resource's information and can be used to manage the resource, for example, via a Console or through APIs. An example syntax for a CID is:

ocid1.<RESOURCE TYPE>.<REALM>.[REGION] [.FUTURE USE].<UNIQUE ID> where, ocid1: The literal string indicating the version of the CID;

resource type: The type of resource (for example, instance, volume, VCN, subnet, user, group, and so on);

realm: The realm the resource is in. Example values are "c1" for the commercial realm, "c2" for the Government Cloud realm, or "c3" for the Federal Government Cloud realm, etc. Each realm may have its own domain name;

region: The region the resource is in. If the region is not applicable to the resource, this part might be blank;

future use: Reserved for future use.

unique ID: The unique portion of the ID. The format may vary depending on the type of resource or service.

Cloud Defense System

Techniques are described for monitoring and collecting data related to reverse or recursive DNS (rDNS) traffic associated with a monitored cloud environment.

A recursive domain name system (DNS) resolver is capable of receiving a fully qualified domain name (FQDN) as the subject of a DNS request from a requesting system, performing a lookup for a corresponding IP address (e.g., via use of an authoritative DNS resolver) and then returning the IP address to the requesting system in response to the request.

A rDNS request is a request to do a reverse lookup compared to the DNS request. Thus, upon receiving a rDNS request that includes an IP address, a recursive DNS resolver is capable of using the received IP address to perform a lookup within a set of pointer (PTR) records for a corresponding FQDN (e.g., via use of an authoritative DNS resolver), and then returning the FQDN to the requesting system in response to the request. The rDNS request may be received from any system that would like to perform a lookup of a FQDN using an IP address. For example, the system may have received the IP address as part of one or more packets received from the IP address, so the system would like to know the FQDN associated with the IP address (e.g., to see if the IP address is trusted by way of trusting the FQDN). As another example, if something is trying to connect to a host machine using SSH it may generate a PTR query because OpenSSH has a number of conditions which may result in a call for getaddrinfo which results in the host issuing a PTR query.

As another example, a rDNS request may be useful for the system to determine if a second system (e.g., server) has set up PTR records, which may act as a hint to the validity of packets received from the second system.

As another example, PTR records may be useful by the system to determine where network traffic originates (e.g., domain name).

The rDNS traffic may include recursive DNS (rDNS) requests originating from a monitored environment (e.g., monitored cloud environment) and responses to those requests received from DNS resolvers. This collected data may be analyzed to identify potential threats to the monitored environment. The potential threats can include actual threats and also irregular behavior of the monitored cloud environment. The collected data may be analyzed to identify potential sources of monitored behavior (e.g., threats) and to identify one or more portions of the monitored environment that are receiving the monitored behavior (e.g., the targets of the threats).

Figure 6:
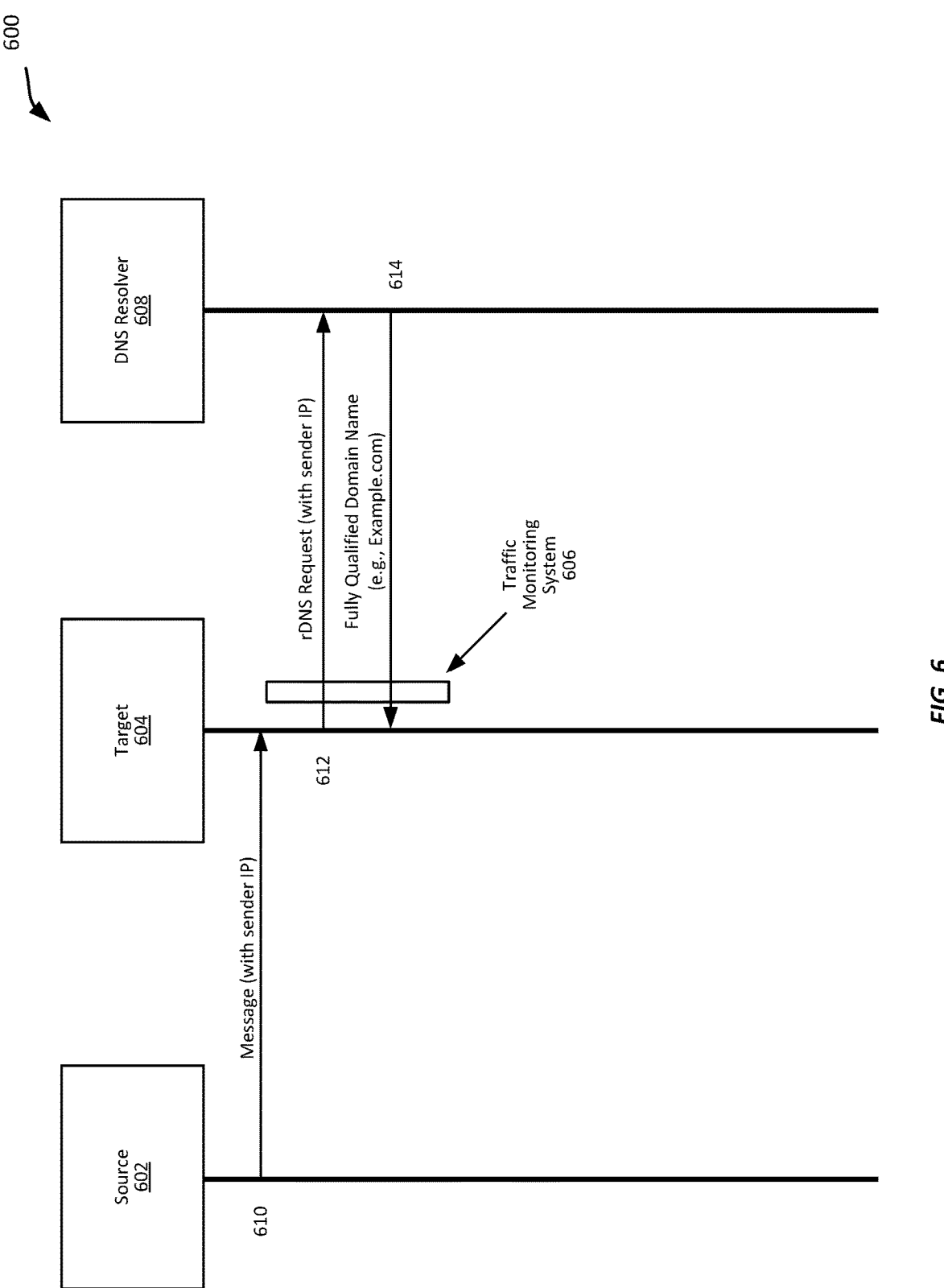
FIG. 6 depicts a simplified flow diagram of the systems and processes involved in a rDNS request and an rDNS response, according to some embodiments.

FIG. 6 depicts a simplified flow diagram of the systems and processes involved in a reverse DNS (rDNS) request and an rDNS response, according to some embodiments.

At 610, a source 602 (e.g., packet sender) may send a message (e.g., one or more packets) to a target 604. A packet may include data about the source 602, such as the IP address of the source 602 that sent the packet. The IP address of the source 602 may be included in a packet header, for example. Once the target 604 receives the message, or a portion thereof, from the source 602, the target 604 may perform a rDNS request to attempt to determine the domain name associated with the IP address of the source 602.

612 illustrates a rDNS request being sent to a DNS resolver 608. The DNS resolver 608 may be capable of determining domain names associated with IP addresses by performing a lookup. If the DNS resolver 608 has information regarding which domain name is associated with an IP address, it may be capable of returning a domain name in response to the request that included an IP address. A rDNS request may be unsuccessful if no domain name for the IP address obtained by the DNS resolver 608 is associated with the IP address.

At 614, the DNS resolver 608 may transmit a response to the rDNS request. The response may comprise a domain name (e.g., fully qualified domain name (FQDN)) of the source 602 that was obtained using the IP address that is associated with the source 602. The response may be sent to the target 604 that had originally made the rDNS request.

Embodiments included herein, may use a traffic monitoring system 606 to monitor the rDNS requests sent to one or more DNS resolvers 608 by one or more targets 604. Further, the traffic monitoring system 606 may be configured to monitor the rDNS responses sent from one or more DNS resolvers 608 to one or more targets 604 as a response to a rDNS request. The traffic monitoring system 606 may be capable of obtaining data from the rDNS requests and responses, such as a timestamp (Ts), a message (e.g., source 602 port, a fully qualified domain name of the source 602, a response) (Msg), an IP address of the source 602, an IP address of the target 604 (Src), a query length of the fully qualified domain name (qLen), a query type (qType), a response code (rc), a time to live (ttl) value, a value used to map the query back to a virtual network (VCNTSig), an internal nameserver view (e.g., viewHash) being used for resolution (e.g., for internal and/or non-internet routed namespaces), a flag for tracking if the resolution path was via the internet or local (path), and/or other data contained in packets sent between a target 604 and a DNS resolver 608. The data capable of being obtained by the traffic monitoring system 606 may be referred to as raw data.

An example of a format for the raw data and the fields included therein may be: {"ts":1620002030957,"msg":

"34157 90.73.0.10.in-addr.arpa.: no-answer","src": "10.9.90.17","qLen":24,"qtype":"PTR","rc":3,"ttl":10, "vcnTsig":"jbrjswk3sjyudsy nektrvq==.","viewHash": "qw5guonijczl6nzkpsvmhmnpfe.view.alt.","path":"p" } or {"ts":1620002030963,"msg":"43377 212.47.115.62.in-addr.arpa.: [PTR las-b24-link.ip.twelve99.net.]","src": "10.7.108.21","qLen":27,"qtype":"PTR","rc":0,"ttl":3021, "vcnTsig" "x9elmuu0rectetf4cmpizq==.","path":"i"}.

The traffic monitoring system 606 may be included in a cloud defense system. The cloud defense system is discussed in more detail below.

Figure 7:
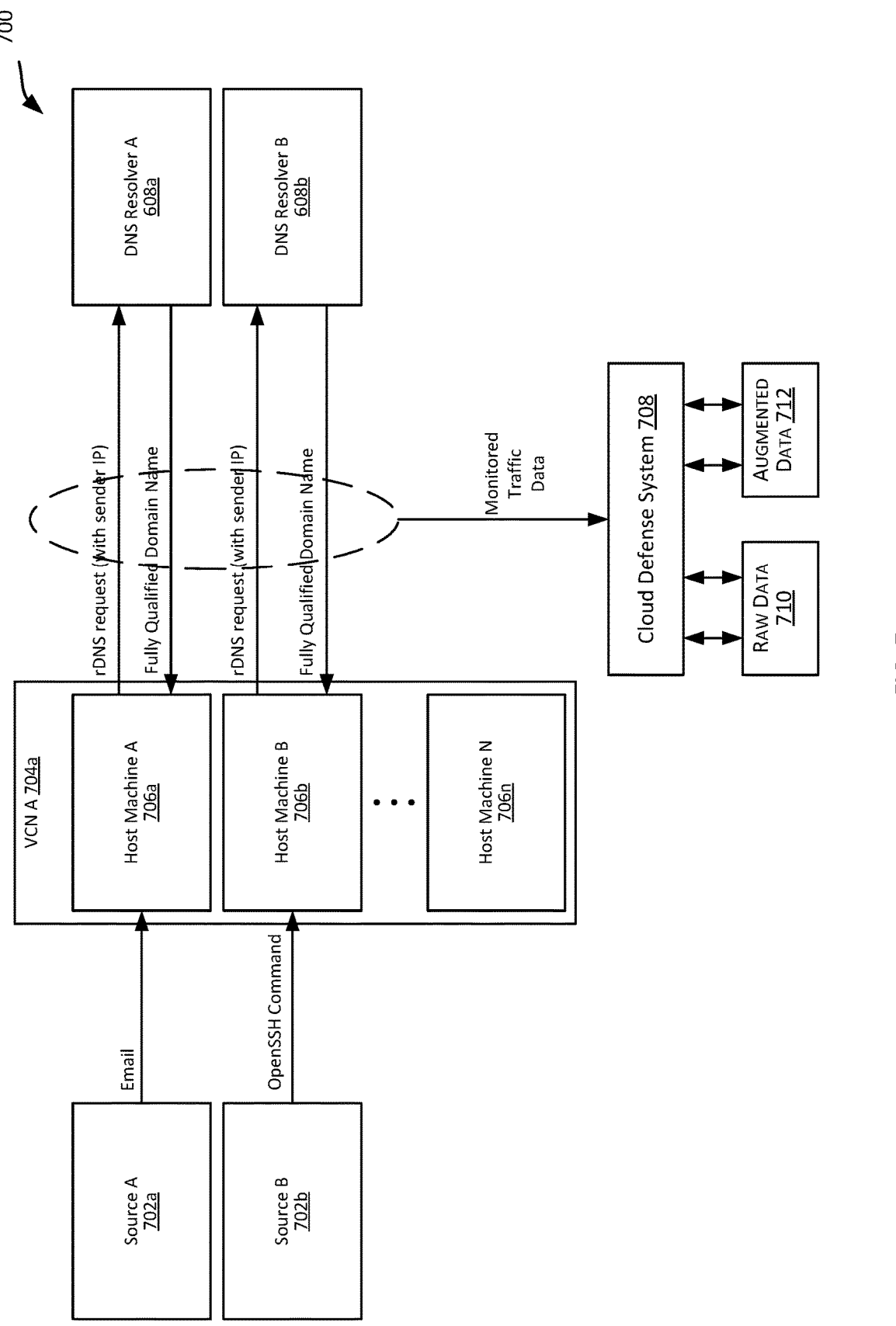
FIG. 7 depicts a simplified flow diagram of the systems and processes involved in obtaining monitored traffic data from rDNS request and an rDNS responses, according to some embodiments.

FIG. 7 depicts a simplified flow diagram of a systems and process involved in obtaining monitored traffic data from rDNS requests and an rDNS responses, according to some embodiments. System 700 illustrates how the systems and methods described with respect to system 600 may be used in a cloud computing environment and scaled.

System 700 shows how multiple sources (e.g., source A 702*a* and source B 702*b*) may each be transmitting one or more packets to one or more host machines (e.g., host machine A 706*a*) via a VCN (e.g., VCN A 704*a*). For example, a source (e.g., source A 702*a*) may transmit one or more packets to one or more host machines (e.g., host machine A 706*a*). Further, one or more host machines (e.g., host machine A) may receive one or more packets from one or more sources (e.g., source A 702*a*).

Packets may be sent to host machines via a respective host machine for various reasons, such as when an email is being sent from a source A 702*a* to a host machine A 706*a*. In another example, a packet is sent to host machine B 706*b* when source B 702*b* is transmitting an openSSH command to host machine B 706*b*.

In some embodiments, a VCN is made up of one or more host machines. In system 700, it is illustrated that a VCN may comprise one or more host machines. Specifically, the VCN A 704*a* illustrated comprises host machine A 706*a*, host machine B 706*b*, and any other number of host machines, as represented by host machine N 706*n*. As described further herein, in some embodiments, one or more regions may comprise one or more VCNs.

Once host machine A 706*a* receives one or more packets from source A 702*a*, host machine A 706*a* may perform a rDNS request with DNS resolver A 608*a* via VCN A 704*a*. Just as described with respect to system 600, system 700 is illustrated as being configured to obtain traffic data, using a cloud defense system 708 (the cloud defense system 708 may include a traffic monitoring system 606), from the rDNS requests and responses between a host machine and a DNS resolver. Requests and responses sent from and to a host machine may be sent and received via a corresponding VCN. The raw data that was discussed above with respect to system 600 would therefore be capable of being obtained using the cloud defense system 708. The monitored raw traffic data may be collected and stored as raw data 710.

Additionally, any number of rDNS requests made by host machine B 706*b*, or any other host machine, to any one of a number of possible DNS resolvers may be monitored by the cloud defense system 708. The corresponding responses to the rDNS requests may also be monitored by the cloud defense system 708.

As a result of the cloud defense system 708 collecting the monitored traffic data from one or more rDNS requests and/or responses between one or more host machines and one or more DNS resolvers, raw data 710 may be collected and stored by the cloud defense system 708. The raw data 710 may be used by the cloud defense system 708 to generate augmented data 712.

Figure 8:
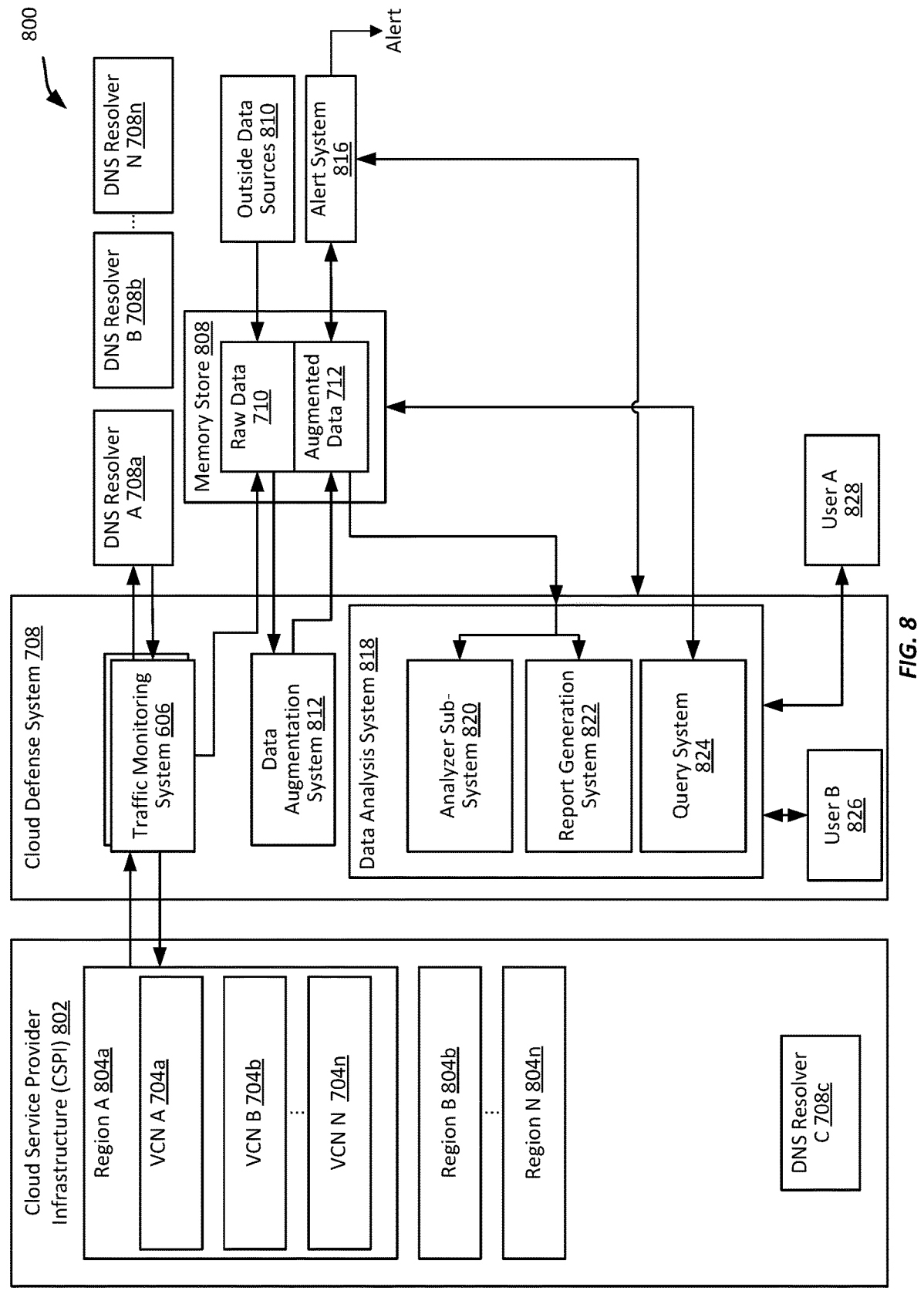
FIG. 8 depicts a simplified architectural diagram of the systems that communicate with and make up a cloud defense system, according to some embodiments.

FIG. 8 depicts a simplified architectural diagram of the systems that communicate with and make up a cloud defense system 708, according to some embodiments.

System 800 illustrates a traffic monitoring system 606 configured to monitor rDNS request and/or response traffic between a cloud service provider infrastructure (CSPI) 802 and one or more DNS resolvers. The components may be logical components, physical components, or a combination thereof.

Like shown in system 700, rDNS requests may be sent from a VCN to a DNS resolver. The cloud defense system 708, like already discussed may monitor the rDNS requests and/or responses sent between one or more VCNs and one or more DNS resolvers via a traffic monitoring system 606. System 800 illustrates that in some embodiments, a cloud service infrastructure may comprise one or more regions, and that each region may comprise one or more VCNs.

The traffic monitoring system 606 may be configured to monitor traffic of an environment (e.g., a distributed environment). The monitored environment may include one or more regions. The monitored environment may include one or more VCNs. Further, each region may include one or more VCNs. In certain embodiments, the monitored environment is a portion of one or more regions. In certain embodiments, multiple traffic monitoring system 606*s* may be used with a CSPI 802 to monitor different environments, the same environments, or different portions of the CSPI 802. Thus, each traffic monitoring system 606 of the cloud defense system 708 may be configured to monitor at least a portion of a CSPI 802. In certain embodiments, a first traffic monitoring system 606 monitors an environment that is included in a first CSPI 802, and a second traffic monitoring system 606 monitors an environment that is included in a second CSPI 802.

As an example of how the traffic monitoring system 606 may be configured, the traffic monitoring system 606 may be configured to monitor rDNS requests and/or responses sent between VCN A 704*a* and one or more DNS resolvers. The raw data 710 collected from the traffic monitoring system 606 may therefore be capable of including rDNS request and/or response data known to be associated with a particular VCN (e.g., VCN A 704*a*).

As another example, the traffic monitoring system 606 may be configured to monitor rDNS requests and/or responses sent from and/or a region (e.g., sent from and/or to at least a portion of the VCNs in the region). The raw data 710 collected from the traffic monitoring system 606 may therefore be capable of including rDNS request and/or response data known to be associated with a particular region (e.g., region A 804*a*) and at least the portion of VCNs thereof.

In some embodiments, the traffic monitoring system 606 is configured to monitor rDNS requests and/or responses made at a global (e.g., all regions) level. The raw data 710 collected from the traffic monitoring system 606 may therefore be capable of including rDNS request and/or response data known to be associated with a particular set of regions and/or VCNs (e.g., the VCNs of region A 804*a* through region N 804*n*).

Additionally, the one or more DNS resolvers that receive one or more rDNS requests from one or more VCNs, regions, and/or CSPIs 802, etc. may be within the environment that the cloud infrastructure is within in some embodiments (e.g., DNS resolver C 708*c*). In some embodiments, one or more of the DNS resolvers are not local to the network that the CSPI 802 is operating within (e.g., DNS resolver A 608*a*, DNS resolver B 608*b*, DNS resolver N 708*n*). System 800 illustrates that there can be any number of DNS resolvers (within the CSPI 802 or external to the CSPI 802) that are capable of receiving rDNS requests from VCNs, where the VCNs may be within one or more regions and/or CSPIs 802.

Like shown in systems 600 and 700, raw data 710 is obtained from monitoring the rDNS requests and/or responses sent between the CSPI 802 (e.g., VCN A 704*a*, VCN B 704*b*, and/or region B 804*b*). The raw data 710 may be stored in a memory store 808. The data that may be included within the raw data 710 has already been described above with respect to system 600.

Additionally, or alternatively to raw data 710 being obtained by the traffic monitoring system 606, the raw data 710 may be obtained from outside data sources 810. For example, outside data sources 810 may be data sources that have data pertaining to network activity, owners of IP addresses, owners of fully qualified domain names, known scanners, information regarding known methods of attack (e.g., an attack may cause a host to request a specific record to trigger a vulnerability in the recursive resolver within a VCN or CSPI, or extract additional metadata about the environment), etc. Outside data sources 810 may comprise data obtained from other traffic monitoring system 606*s* and/or other cloud defense system 708*s*. In example attack activity that may be recorded in the outside data source 810, an attacker defines a PTR for the IP performing brute forcing that contains specific data or structure with the intent of using the attempted connection to enumerate details about the DNS infrastructure.

Outside data sources 810 may provide information to be used as raw data 710 or information to be combined with the raw data 710. For example, the raw data 710 may include a first fully qualified domain name associated with a first rDNS response, the outside data sources 810 may signal that the fully qualified domain name is a known scanner (e.g., a scanner that should not be blocked, a scanner that should be blocked) and therefore the outside data source 810 may be used to supplement the operation of the data augmentation system 812. Thus, in certain embodiments, the outside data sources 810 are capable of transmitting data to the data augmentation system 812 to assist the data augmentation system 812 in creating augmented data 712.

The data augmentation system 812 may be capable of using raw data 710 to generate augmented data 712. In certain embodiments, the data augmentation system 812 additionally, or alternatively, uses outside data sources 810 to generate augmented data 712 (e.g., databases of augmented data 712 or portions thereof, regional internet registrar information, etc.). In certain embodiments, the augmented data 712 includes at least the raw data 710.

The augmented data 712 may include data from the raw data 710. For example, the augmented data 712 may include a timestamp (Ts), a message (e.g., source port, a fully qualified domain name of the source, a response) (Msg), an IP address of the source, an IP address of the target (Src), a query length of the fully qualified domain name (qLen), a query type (qType), a response code (rc), a time to live (ttl) value, a value used to map the query back to a virtual network (VCNTSig), an internal nameserver view being used for resolution (e.g., for internal and/or non-internet routed namespaces) (viewHash), a flag for tracking if the resolution path was via the internet or local (path), and/or other data contained in packets sent between a target and a DNS resolver.

Thus, information that comprises the augmented data 712 may further be obtained by using a registrar (e.g., regional internet registrar) data. The registrar data may be capable of being used to identify the owner of an IP address, the range of IP addresses in a NetRange, an organization, and/or other associated details. For example, a PTR or pointer record may provide a reverse mapping between an IP address and a domain name. The PTR may be the inverse of the PTR record, and a domain name that the PTR record is mapped to may be capable of providing context about interactions with an IP address or be used to associate the IP address to a larger infrastructure.

Further, routing table (e.g., RIPE, routeviews) data may be used to identify who is routing a prefix associated with an IP address. In some embodiments, if an OriginAS value is defined for the prefix in regional internet registry (RIR) data but does not match routing data, a flag is associated with the prefix associated with the IP address. The flag may indicate that the data is irregular.

In certain embodiments, the augmented data 712 may comprise a reversed sender IP address that is the subject of the rDNS request, a fully qualified domain name (FQDN), a network identifier (e.g., TSIG), a region, a rDNS response code, network source that the network traffic is originating from (e.g., autonomous system number (ASN) ("OriginAS"), owner of the network that the network traffic is originating from (e.g., prefix owner ("Organization")), NetRange, CIDR, NetName, NetHandle, Parent, NetType, RegDate, Updated, Address, City, StateProv, Postal Code, Country, OrgAbuseHandle, OrgAbuseName, OrgAbusePhone, OrgAbuseEMail, OrgID, ASNumber, ASName, ASHandle, and/or other information associated with the IP address of the sender that is the subject of the rDNS request.

Accordingly, each rDNS request may result in the generation of raw data 710 which may then be used to generate augmented data 712. The data augmentation system 812 may then transmit the generated augmented data 712 to the memory store 808. Augmented data 712 may be used to perform data analysis using the data analysis system 818. In certain embodiments, the augmented data 712 may be clustered by the data augmentation system 812 to facilitate the data analysis performed by a data analysis system 818.

Thus, augmented data 712 may comprise clustered augmented data and/or non-clustered augmented data.

Clustering may be performed to group similar augmented data together. For example, augmented data may be similar if an IP address (e.g., source IP, target IP, IP being looked up using a rDNS request) is the same, the TSig (each VCN may have a unique VCN TSig) is the same, the prefix is the same, the autonomous system is the same, etc. Therefore, clustering is capable of grouping observations related to pointers. For example, a cluster may group augmented data by pointer namespace to assist in identifying clusters of infrastructure.

Identifying clusters of infrastructure is possible by looking across augmented data to determine patterns of associated infrastructure that might originate from different prefixes or autonomous systems. In some embodiments, false positive rates may be reduced by using a public suffix list.

As an example, IP addresses 209.141.58.151, 198.98.59.197, 209.141.35.27, and 199.195.254.209 may be mapped to the exit01.oxds(.)org, exit03.oxds(.)org, exit10.oxds(.)org, and exit17.oxds(.)org namespaces, respectively. Therefore, the augmented data associated with each of the IP addresses in the above example may be grouped into one associated cluster of namespaces that are all associated with the oxds(.)org namespace.

As a result of clustering, a total count of queries per a region, per a CSPI 802, per a VCN, per a sender IP, per an IP in a pointer, and/or per a VCN network identifier (e.g., TSIG), may at least be determined. By grouping similar information together, the scale of the information can be used to determine trends (e.g., anomalies, patterns) in the augmented data 712. Through analyzing augmented data clusters, an analysis of the related information can be performed and provide further information compared to the non-clustered augmented data for an individual rDNS request and/or response. Results from the clustering may also provide an understanding of whether individual nodes are being used for initiating network traffic or if the super set of the infrastructure is being used. Additionally, a larger population of the nodes associated with a namespace may be determined by clustering the augmented data.

The augmented data 712 (clustered and/or non-clustered augmented data) may be transmitted to an alert system 816. The alert system 816 may use the augmented data 712 to determine if an alert should be generated based on the augmented data 712 received. The alert system 816 may be a preexisting alert system 816 that is capable of using the augmented data 712 obtained from the traffic monitoring system 606 and data augmentation system 812 to generate alerts for one or more systems (e.g., the cloud defense system or another system). An alert may cause a report to be generated (e.g., log, email, printout), configuration to occur (e.g., flag set), or another action to be taken. In certain embodiments, the alert system may be capable of communicating with the cloud defense system to generate alerts and/or in response to generating alerts.

The augmented data 712 (e.g., clustered augmented data and/or non-clustered augmented data) may be transmitted to a data analysis system 818. The data analysis system 818 may be capable of analyzing augmented data 712 to determine trends, patterns, anomalies, generate reports, respond to queries, perform system configurations, determine where network traffic is being generated from, determine what baseline network traffic is observed and/or expected, etc. The data analysis system 818 may comprise an analyzer subsystem 820, a report generation system 822, and/or a query system 824.

The analyzer subsystem 820 may be capable of analyzing augmented data 712. The analyzer subsystem 820 may be capable of generating one or more alerts or one or more reports. Further, the analyzer subsystem 820 may be capable of identifying one or more patterns in the augmented data 712. An identified pattern may represent baseline network activity or irregular network activity.

Baseline network activity, for example, may represent one or more IP addresses, VCNs, regions, CSPIs 802, networks, fully qualified domain names, and/or IP address owners, that are sending and/or receiving requests (e.g., within or outside of the CSPI 802). Baseline network activity may represent the number of rDNS requests made by a certain VCN, region, CSPI 802, etc. on average within a time period (e.g., second, minute, hour, day, week, month, year, etc.), time of day, time of year, etc. Baseline network activity may represent the fully qualified domain names and/or IP address that are the subject of rDNS requests for a period of time. Baseline network activity may represent the baseline of any combination of measurements included in the augmented data 712.

Baseline network activity may be determined using an average (e.g., an average number of packets from a first IP address) or other metrics representative of prior trends observed by the traffic monitoring system 606 relating to any portion of the augmented data 712 capable of being obtained with the use of the traffic monitoring system 606.

Baseline network activity may be used to determine what network traffic is expected in a certain context (e.g., time of day). Baseline network activity can be used to set a baseline for the number of rDNS resolver requests and/or responses sent and/or received by a monitored environment (e.g., VCN, region). In certain embodiments, baseline network activity may be used to determine how many rDNS requests include a same IP address in a given period of time. In certain embodiments, baseline network activity may be used to determine how many rDNS request responses include a same FQDN, or associated with a same owner, in a given period of time.

Baseline network activity may be used to compare with subsequently monitored network activity, in the same or different monitored environment, to help determine if irregular network activity is taking place, what environment or portion thereof is the subject of irregular network activity, and/or may be used to help determine what is causing irregular network activity. Accordingly, the baseline network activity may be used to set a network activity threshold so that any activity outside of the network activity threshold may be categorized and/or further analyzed.

Through observing network activity of a monitored environment to establish baseline network activity for the monitored environment, false positives of irregular network activity may be reduced because observations may be compared with the baseline network activity in varying ways (compared to the network activity for a monitored environment, the network activity for a portion of the monitored environment, considering other context available within the augmented data, etc.). Thus, acquiring a baseline network activity may be used to more accurately identify what should constitute abnormal network activity.

For example, in certain embodiments, when a number of rDNS requests are being generated by a monitored environment (e.g., a VCN, a region) for a first period of time, and the number is sufficiently greater (e.g., 50% greater) than the baseline rDNS requests for a second period of time, the monitored environment may be deemed as being under attack. The first period of time and second period of time may be the same amount of time (e.g., one-minute) and/or same window of time (e.g., from noon to midnight on a first day compared to noon to midnight on a second day).

In certain embodiments, the current network activity of a monitored environment may be compared with the corresponding baseline network activity metrics of the same monitored environment or a different monitored environment (e.g., VCN, region, and/or other monitored environment).

In certain embodiments, when a monitored environment's network activity is sufficiently different than the baseline network activity, any number of actions (e.g., zero or more) may be performed.

Actions that may be performed in response to the detection of the network activity that is sufficiently different from the baseline network activity may be to determine at least one of: the portion of the monitored environment that the network activity is targeted toward (e.g., region A 804a, VCN A 704a) and the source(s) that the network activity is arising from (e.g., the IP address(es), the owner of the IP address(es)). In some embodiments, other information relating to irregular network activity is also collected, such as the port associated with the network activity.

The data analysis system 818 may also include a report generation system 822. The report generation system 822 may be capable of generating reports based on at least one of: analysis performed by the analyzer subsystem 820, augmented data 712, and input from the query system 824.

The report generation system 822 may be capable of generating a report that includes specific information. The information included in the generated report may be dependent on the type of report that has been generated, what caused the report to be generated, parameters used when initiating the report generation, and/or the data that is included within the report.

As an example, the analyzer subsystem 820 may cause a report to be generated by the report generation system 822 when the analyzer subsystem 820 compiles monitored environment network activity (e.g., baseline activity, irregular activity, etc.), such as at least a portion of the augmented data 712 (e.g., data included in the rDNS requests and responses).

The query system 824 may cause a report to be generated by the report generation system 822 when a user of the query system 824 submits a request for the query system 824 to obtain a report or generate a report. The user of the query system 824 may have the ability to specify what data they would like in a generated report. In some embodiments, the user may be limited (e.g., by user permissions) to the data they may request from the query generation system and thereby the data that may be included within the generated report.

The report generation system 822 may also be capable of monitoring augmented data 712 to determine if a report should be generated. In some embodiments, a report is generated upon a condition occurring (e.g., an irregular event occurring, a request being submitted) or may be scheduled (e.g., a report is generated once a day).

The report generation system 822 may be capable of transmitting a generated report. The generated report may be transmitted to another system (e.g., a user device, a printer, another system, etc.).

The data analysis system 818 may also include a query system 824. The query system 824 may be capable of receiving queries generated by other systems and/or users. The queries received form the query system 824 may be received from users and/or systems within the cloud defense system 708 environment (e.g., administrators of the cloud defense system 708, user B 826) and/or from users and/or systems external to the cloud defense system 708 (e.g., public users, customers of the cloud service provider, other systems capable of using the augmented data 712, user A 828, etc.). The query system 824 may be capable of receiving query input and performing searches of the augmented data 712 to generate an output that is responsive to the received query.

In some embodiments, the query system 824 is configured to transmit information to a system or user based on whether the system or user is within the cloud defense system 708 or has another way to determine a permission level.

In certain embodiments, other system may be configured to use the query system 824 in order to obtain augmented data 712 that was obtained from the cloud defense system 708 so those systems may perform further actions. In certain embodiments, the alert system 816 may be configured to use the query system 824.

Figure 9:
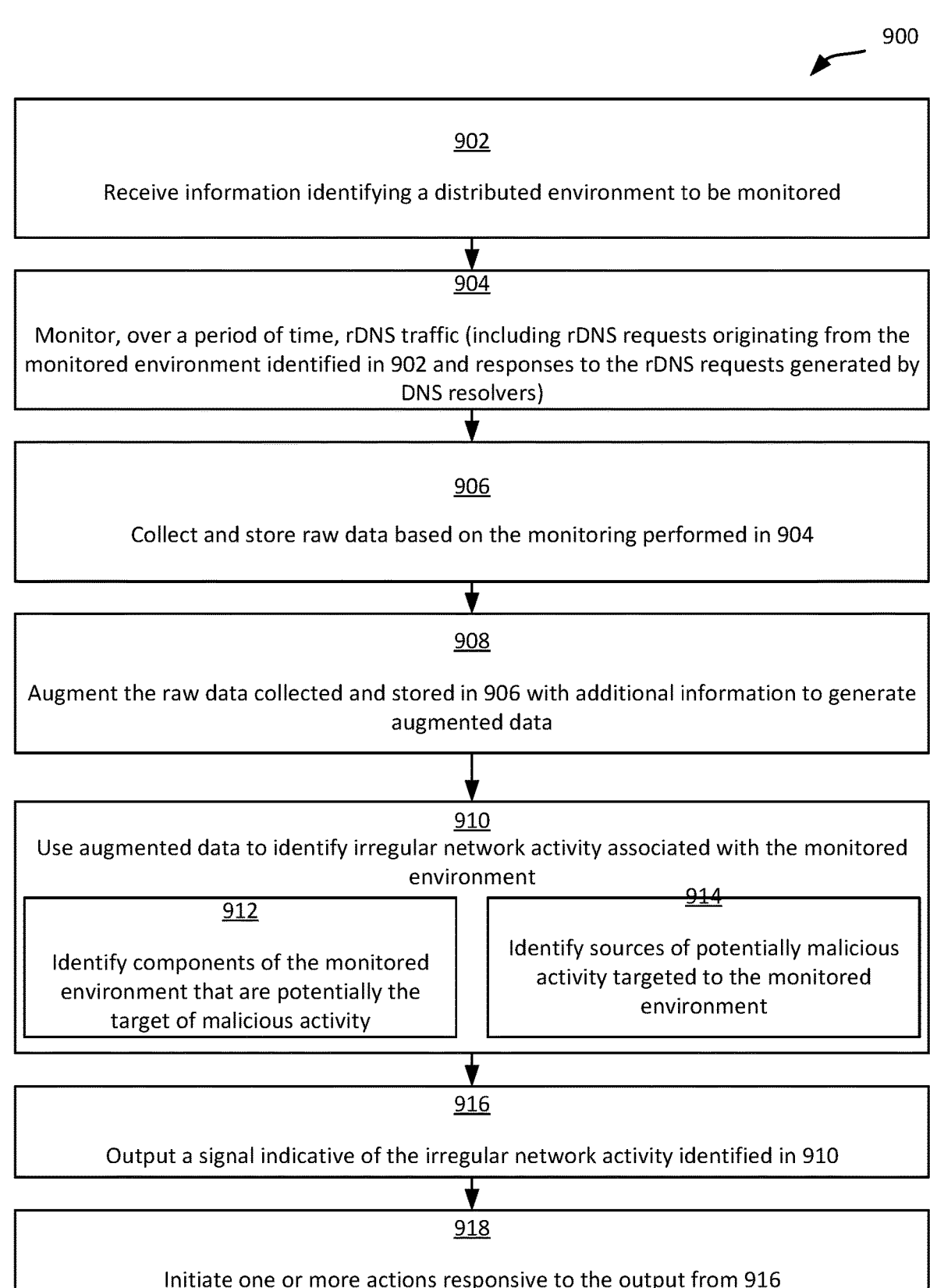
FIG. 9 depicts a simplified flowchart 900 depicting a method for using rDNS traffic to protect a monitored environment, according to some embodiments.

FIG. 9 depicts a simplified flowchart 900 depicting a method for using rDNS traffic to protect a monitored environment, according to some embodiments. In the example embodiment depicted in FIG. 9, the processing depicted in flowchart 900 may be performed by cloud defense system 708.

At 902, information identifying an environment to be monitored is received (e.g., a distributed environment). The monitored environment may include portions of infrastructure provided by a CSP to provide one or more cloud services to customers of the CSP. The monitored cloud environment may include one or more VCNs running payloads for customers of the CSP. For example, the monitored environment may be a data center of the CSP, a portion of a data center, multiple data centers in a region, infrastructure in multiple regions, global infrastructure, and the like. In certain embodiments, the information received in 902 may identify one or more VCNs to be monitored (e.g., unique network identifiers (VCN TSigs) of the VCNs), for example, one or more VCNs belonging to one or more customers (the one or more VCNs may be associated with one or more customers, regions, etc.).

At 904, over a period of time, rDNS traffic associated with the monitored environment identified in 902 is monitored. Monitoring rDNS traffic in 904 may include monitoring requests that originate from the monitored environment and/or monitoring responses to the rDNS requests directed to the monitored environment and received from one or more DNS resolvers. As previously described above with respect to flow 600 in FIG. 6, a rDNS request generally results in a corresponding rDNS response to be received from a DNS resolver, however, in certain situations no response may be generated by the DNS resolver. This may happen, for example, when there is no pointer record stored by the DNS resolver for the IP address identified in the rDNS request.

At 906, based upon the monitoring performed in 904, data is collected and stored for the monitored environment related to the monitored rDNS traffic. For purposes of this disclosure, the data collected and stored at 906 may be referred to as raw data. This is to differentiate this data from augmented data discussed below. The term raw data is not intended to, in any way, limit the scope of the claimed embodiments. Data that may be included in the rDNS requests and/or responses, and that may be collected and stored in 906, has been described above with respect to flow 600 in FIG. 6.

The raw data may be stored in various different formats, such as documents, tables, files, data stores, data lakes, databases, etc. The raw data may be stored locally and/or remotely from the cloud defense system.

At 908, the raw data collected and stored in 906 is augmented with additional information to generate augmented data. There are various way in which the raw data may be augmented. For example, the augmenting may include at least one of: adding or supplementing the raw data with additional information, organizing the raw data in a certain desired manner to facilitate analysis (e.g., clustering the data along one or more dimensions), or replacing at least a portion of the raw data.

The raw data may include: a timestamp (Ts), a message (e.g., source 602 port, a fully qualified domain name of the source 602, a response) (Msg), an IP address of the source 602, an IP address of the target 604 (Src), a query length of the fully qualified domain name (qLen), a query type (qType), a response code (rc), a time to live (ttl) value, a value used to map the query back to a virtual network (VCN TSig), an internal nameserver view (e.g., viewHash) being used for resolution (e.g., for internal and/or non-internet routed namespaces), a flag for tracking if the resolution path was via the internet or local (path), and/or other information contained in packets sent between a target 604 and a DNS resolver 608.

The information added to the raw data may be obtained from various sources, including sources internal to the monitored environment and sources external to the monitored environment. The sources external to the monitored environment may include sources provided by the CSP or sources provided by other third parties. For example, additional raw data (e.g., collected by another monitored environment, collected at a different time) may be added to the raw data to generate augmented data or a portion thereof. In another example, augmented data (e.g., collected by another monitored environment, collected at a different time by the same monitored environment) may be added to the raw data.

Supplementing the raw data may include using the raw data to obtain further data to be included in augmented. As an example, augmented data may include raw data or portions or raw data. Augmented data may include data obtained using a registrar (e.g., regional internet registrar) data to supplement the raw data. The registrar data may be capable of being used to identify the owner of an IP address, the range of IP addresses in a NetRange, an organization, and/or other associated details. For example, a PTR or pointer record from the raw data may provide a reverse mapping between an IP address and a domain name. The PTR may be the inverse of the PTR record, and a domain name that the PTR record is mapped to may be capable of providing context about interactions with an IP address or be used to associate the IP address to a larger infrastructure.

Further, when supplementing the raw data to generate augmented data, routing table (e.g., RIPE, routeviews) data may be used to identify who is routing a prefix associated with an IP address included in the raw data. In some embodiments, if an OriginAS value is defined for the prefix in regional internet registry (RIR) data but does not match routing data, a flag is associated with the prefix associated with the IP address. The flag may indicate that the data is irregular.

Augmented data may be generated by replacing at least a portion of the raw data. Data fields included in the raw data may be replaced with known associated information. For example, the raw data may include a first FQDN address and the cloud defense system may be configured to replace the ".com" portions of the FQDN with a value representative of the characteristic of the top-level domain (TLD) (e.g., ".com"). Such replacement of values may be capable of reducing processing times. Further, values may also be replaced with encrypted values to preserve the privacy of one or more values of augmented data.

Augmented data may be generated by deleting at least a portion of the raw data. For example, a time to live value may be removed as it may be deemed as not providing worthwhile insights to the monitored environment. Removal of such information may reduce the amount of storage used and the time to process the augmented data so that irregular activity can be recognized more quickly and corresponding actions may be taken faster. In certain embodiments, deleting at least a portion of the augmented data may be performed to increase privacy. For example, a customer using the monitored environment may wish to have the monitored network activity of a one of their VCNs not used to create augmented data or may desire that the VCN TSig is removed form the raw data to create the augmented data. Augmented data may be generated by organizing the at least a portion of the raw data.

Organizing the raw data may be performed to increase the efficiency of further analysis. For example, the raw data may be organized at hierarchical levels. For example, augmented data may be generated by organizing all rDNS requests from a first VCN into a single augmented data entry. In another example, augmented data may be generated by organizing all rDNS requests from a first region (e.g., the first VCN and a second VCN) into a single augmented data entry. In another example, augmented data may be generated by organizing all rDNS request responses that include the same FQDN into a single augmented data entry. Accordingly, the organizing of raw data and/or augmented data may be performed across multiple dimensions and may be referred to as "clustering."

In certain embodiments, the augmented data may comprise a reversed sender IP address that is the subject of the rDNS request, a fully qualified domain name (FQDN), a network identifier (e.g., VCN TSIG), a region, a rDNS response code, network source that the network traffic is originating from (e.g., autonomous system number (ASN) ("OriginAS'")), owner of the network that the network traffic is originating from (e.g., prefix owner ("Organization")), NetRange, CIDR, NetName, NetHandle, Parent, NetType, RegDate, Updated, Address, City, StateProv, Postal Code, Country, OrgAbuseHandle, OrgAbuseName, OrgAbusePhone, OrgAbuseEMail, OrgID, ASNumber, ASName, ASHandle, and/or other information associated with the IP address of the sender that is the subject of the rDNS request.

The augmented data may be capable of being used to determine baseline network activity for the monitored environment or a portion thereof. In a first example, the augmented data may be used to determine the baseline rDNS requests sent by the monitored environment or a portion (e.g., VCN) thereof. In a second example, the augmented data may be used to determine if the monitored environment is observing activity that is different from a baseline network activity for the monitored environment. The baseline network activity for the monitored environment may be based on prior augmented data obtained from the same monitored environment or a different monitored environment, may be configured by a user of the cloud defense system, and/or may be based on one or more outside data sources.

At 910, the augmented data is used to identify irregular network activity associated with the monitored environment. In certain embodiments, the processing performed in 909 may include, performing processing of 912 and 914.

At 912, the augmented data generated in 908 is used to identify components of the monitored environment that are potentially the target of malicious activity. The augmented data may be used to determine if the monitored environment is observing behavior that is different from the baseline network activity. Monitored network activity may be different from the baseline network activity of the monitored environment if a difference threshold is exceeded. The difference threshold may be set using a configuration made by a user of the cloud defense system and/or monitored baseline data.

Some example of thresholds that may evaluated are: a number of rDNS requests made by a particular monitored environment (e.g., VCN, region) for a given period of time, a number of rDNS requests including a first piece of information (e.g., IP address), a number of rDNS request responses including a second piece of information (e.g., fully qualified domain name), a number of rDNS requests within a cluster of augmented data, a number of rDNS request determined to be associated with a certain IP address owner, time between rDNS requests that include one or more same pieces of information, etc. The threshold may relate to one or more fields of information from the augmented data. In certain embodiments, a whether a baseline is sufficiently different from augmented data may be determined using a machine learning model (e.g., to determine the similarity is within a threshold between the baseline and the augmented data).

Another example of a threshold that may be evaluated is the number of rDNS requests that don't return a response and as a two phase analytic which includes the number that return an FQDN and the number for which that FQDN resolves proper vs an NXDomain/ServFail. Another example of a threshold that may be evaluated is the number of rDNS requests for paired IPv4 and IPv6 addresses for dual stacked hosts, these can be used to establish or anchor ties between v4 and v6 prefixes. Thresholds may evaluate common infrastructure such as the provider of authoritative DNS for the portion of the in-addr.arpa zone.

Thus, the augmented data obtained from the monitored environment may be compared with monitored baseline network activity and/or a user selected baseline network activity to determine if one or more portions (e.g., VCN, region) of a monitored environment are potentially the target of a malicious attack and/or are experiencing network activity that may be considered unexpected (e.g., based on user defined expectations and/or past network activity) and therefore may indicate potential malicious activity.

At 914, the augmented data may be used to identify sources of malicious activity targeted to the monitored environment. Sources may be identified by determining which sources (e.g., IP address(es), fully qualified domain name(s), owner(s)) correspond to augmented data that has exceeded a defined baseline threshold value.

At 916 a signal indicative of the irregular network activity identified during 910 may be output. The signal may be output to a component of the cloud defense system and/or may be output to another system. One system that may be external to the cloud defense system may be a alert system used to generate and transmit alerts based on output signals from one or more systems. Whether or not irregular network activity is identified during 910 a signal may be generated and output during step 916. Thus, the signal may be indicative of irregular network activity occurring or not occurring. Additionally, whether or not irregular network activity is identified during 910, the flow illustrated by flow diagram 900 may be repeated any number of time. For example, the processing may continuously be performed by a cloud defense system to continuously monitor a monitored environment for irregular network activity. Thus, additional collected raw data may be augmented and may be compiled with existing augmented data to further analyze.

At 918 one or more actions may be initiated in response to the signal output during 916. After one or more components of the monitored environment are identified as potentially being under attack and/or one or more sources of potentially malicious activity are identified at 914, any number of actions may be performed (e.g., by determining irregular network activity is occurring compared to one or more baseline network activity thresholds). For example, system configurations may be made (e.g., taking a VCN offline, blocking an IP address, dropping certain packets, setting up a firewall, generating a log, generating a report, patching a system, rerouting network traffic, contacting the source).

In an example where network traffic is rerouted, in certain embodiments, the network traffic may be rerouted to a high interaction honeypot. Available data may allow for the honeypot to match the spec and services of the deployed host. The honeypot may allow the connection to complete and observe the actor's actions if they gained access to the host.

FIG. 10 depicts a simplified flow diagram for monitoring a monitored environment to determine a baseline network activity and determine actions to perform if irregular activity is identified, according to some embodiments. In the example embodiment depicted in FIG. 10, the processing depicted in flowchart 1000 may be performed by cloud defense system 708.

At 1002, augmented data that has been collected (e.g., over a period of time) may be used to generate a baseline for the monitored environment. The augmented data may have been collected in a similar way in which the augmented data was obtained during 904, 906, and 908 from the same monitored environment or from a different environment. In some embodiments, the baseline network activity is generated using an algorithm or user-specified values.

The augmented data may be capable of representing a baseline for the monitored environment or a portion thereof. As an example, the augmented data may represent that the monitored environment transmits 400 rDNS requests to resolve a first IP address on average within a first period of time. Thus, the baseline rDNS requests for that IP address, the corresponding FQDN identified in a possible rDNS request response, an owner associated with the IP address, and/or the monitored environment may be determined to be 400 within a period of time of equal length to the first period of time.

A baseline may be generated for IP addresses causing an rDNS request, a FQDN associated with the IP address, an owner associated with the IP address, the type of requests, and/or any other information included in the augmented data. A baseline may also be generated to determine the number of rDNS requests being sent by the monitored environment or a portion thereof. Additionally, the baseline may be specific to one or more VCNs, regions, customers, the entire monitored environment, etc.

A baseline may have a scope, the scope being the portion (or entirety) of the monitored environment to which the baseline applies to (e.g., the baseline is representative of the network activity for VCN A and VCN B as a total, the baseline is representative of the network activity for VCN A and VCN B as an average). A baseline may also have a target, the components of the monitored environment that the baseline is evaluated for (e.g., determining if VCN A (target) exceeds the baseline threshold). The target may include the same or fewer number of system components as the monitored environment.

Thus, whether a baseline has been deviated from may be evaluated for a single VCN within a monitored environment or more than one VCN within a monitored environment depending on the target. As a further example where a monitored environment includes a group of VCNs, a first baseline may be evaluated for a group of VCNs (the target) within the scope of the baseline (the group of VCNs) to make a single determination as to whether the baseline is deviated from. In another example, a second baseline may be evaluated for each VCN (targets) within the scope (the group of VCNs). Further, each target within a monitored environment to be compared to a baseline may have its own (e.g., unique, independently determined) baseline threshold compared to the other targets within the monitored environment.

At 1004, in a similar way to which the baseline may be established from monitoring the monitored environment or a portion thereof, additional monitoring may occur to determine if the baseline has been deviated from. Accordingly, at 1004, the augmented data collected for the monitored environment is used to identify a deviation from the baseline.

The deviation from the baseline may be determined based on the baseline values for one or more augmented data information fields being different (e.g., lower, higher, more than a threshold value away, etc.) from the baseline value for one or more augmented data information fields.

As an example, if the baseline number of rDNS requests sent by a monitored environment is 500 within one minute, then the baseline may have been set to 500 plus or minus 50 (or 10%). Accordingly, a deviation may be flagged if more than 550 rDNS requests or less than 450 rDNS requests have been sent by the monitored environment. Similarly, the baseline may have varying levels of specificity such as being directed toward how many rDNS request responses were resolved by the monitored environment, how many rDNS request responses resolved to a certain FQDN, how far apart in time a set of rDNS requests were that all were related to resolving the same IP address or IP address owned by the same person, or compare other augmented data fields.

At 1006, if a deviation was identified during 1004, the deviation may be flagged as an irregular activity associated with the monitored environment. Responsive to an activity being flagged or not, one or more actions may then occur.

At 1008, one or more actions may be performed in response to the identification of the flagged activity at 1006. An alert may be a kind of action that is performed.

At 1008, a set of actions (e.g., alerts) may be identified. Each action in the set of actions may have one or more conditions associated with the action. The conditions may relate to information included within the augmented data. Thus, the conditional logic may be satisfied, causing one or more actions, when a certain value or combination of values is present within the augmented data. Additionally, or alternatively, actions (e.g., alerts) may be based on time (e.g., reporting data at certain time intervals).

Actions could relate to whether a certain IP address is being observed and/or whether a certain number of requests from a single IP address, FQDN, or owner is being observed. Further, actions may relate to whether an attack may be occurring, micro scanning is detected, and/or scanning is detected.

In certain embodiments, updating of a DNS service may occur as an action. For example, a two phase PTR may return an FQDN (e.g., valid or invalid). If the FQDN is invalid and the IP belongs to the company, this may signal DNS incongruity that causes an updating of a DNS service to remove the PTR as designated a notional maintenance activity. Actions may also send abuse reports to other providers. As another action example, if multiple IPs from the same prefix, ASN, or associated with the namespace are observed it could be a sign of a larger problem prompting a need to alert other systems (e.g., in-network, out-of-network) as well potentially as the other network.

Actions may be configured by a user of the cloud defense system (e.g., an internal user B, an external user A), by a user of another system, by processes of another system, etc.

For each action in the set of actions, the conditions for the action may be evaluated to determine if the conditions for the action have been satisfied and therefore an action should be performed. A determination may be made using the augmented data obtained at 1004. The determination may evaluate whether one or more conditions associated with the action are satisfied. The determination may evaluate whether there is a flagged deviation in 1006. Non-exhaustive examples of such conditions may be: whether a respective VCN from the monitored environment is sending a number of rDNS requests that is a magnitude higher (e.g., two times higher, one and a half times higher) or lower than the baseline for the VCN and/or monitored environment. Another condition may be whether a respective VCN from the monitored environment is sending a number of rDNS requests that is a defined value higher (e.g., 100 requests higher) or lower than the baseline for the VCN and/or monitored environment. Another condition may be whether a respective VCN from the monitored environment is sending a number of rDNS requests to lookup a particular IP address that is sufficiently higher than the baseline (e.g., the baseline for the particular IP address), a particular IP address that is sufficiently higher than the baseline for the particular VCN making the request, and/or a particular IP address that is sufficiently higher than the baseline for the particular monitored environment making the request. The conditions may be the same or different conditions than were evaluated when determining if irregular network activity has occurred.

Further, depending on the condition being satisfied a different type of action may be taken for the same irregularity that was determined (e.g., based on the severity (e.g., difference from baseline, portion of the monitored environment experiencing the irregularity, etc.) of the irregularity).

If an action condition has not been satisfied, continued evaluation of action conditions may occur. For example, more augmented data may be gathered to subsequently determine if an action condition has been satisfied (e.g., returning to 1004).

If an action condition has been satisfied, the corresponding action may be performed.

One or more actions may be initiated as a result of the one or more conditions for an action having been satisfied. A non-exhaustive list of actions has already been discussed above. Some example actions may be configuring a firewall, dropping packets, quarantining a machine or portion of a network, generating a report, transmitting a report, logging data, blocking an IP address, FQDN, and/or owner, unblocking an IP address, FQDN, or owner (e.g., the IP address has not been seen for a certain amount of time, the number of packets received from the IP address have gone back down (e.g., below a threshold volume or share of network activity)).

FIG. 11 depicts a simplified flow diagram for determining a baseline rDNS request volume for a monitored environment, according to some embodiments. In the example embodiment depicted in FIG. 11, the processing depicted in flowchart 1100 may be performed by cloud defense system 708. Flowchart 1100 may be an example of the process that occurs during 1002.

At 1102, a set of one or more VCNs that are the sources of the one or more rDNS requests are identified, the VCNs may also be within a monitored environment. The source of the rDNS request may be identified by determining the IP address used in the sender block of the rDNS request or may be identified using a unique network identifier (e.g., VCN TSig). The source of a rDNS request may be included in the augmented data. The monitored environment may be of any scope and therefore may include one or more VCNs, regions, customers, etc.

At 1104, a determination is made for each VCN identified at 1102, the determination evaluating, from the augmented data, VCN related rDNS information. The VCN related information may include any amount of data capable of being obtained from rDNS requests and/or responses. For example, the volume of rDNS requests and/or responses to rDNS requests may be determined from the augmented data on the scale of the monitored system, a region(s), and/or VCN(s), etc. In an example, additionally or alternatively, the volume of rDNS requests and/or responses to rDNS requests may be determined from the augmented data with respect to a particular set of one or more IP addresses, FQDNs, and/or owners. In an example, the number of rDNS requests that did not return a FQDN may be determined. In yet another example, one or more fields of the augmented data fields may be determined using the rDNS information, as described herein (e.g., above).

As a first example of determining a volume of rDNS requests, a monitored environment may include VCN A, VCN B, and VCN C. During a first period of time, 1104 may determine that 400 rDNS requests originated from VCN A, 100 rDNS requests originated from VCN B, and 100 rDNS requests originated from VCN C.

At 1106, a baseline network activity for the monitored environment may be determined based on the processing performed during 1104. The baseline may be generated for an entire monitored environment (e.g., one or more VCNs, one or more regions, one or more customers, etc.) or a portion thereof (e.g., one VCN, two VCNs, one region, one customer, etc.).

The volume of rDNS requests originating from the VCNs, the IP addresses identified in those requests, and/or other information associated with the IP addresses identified in the requests during 1104 may be aggregated with one or more other VCNs to determine a baseline for the entire environment or a portion thereof. The baseline network activity may include augmented data representative of a period of time and/or be gathered over a period of time. The baseline network activity may be a statistical representation of the rDNS requests originating from a monitored environment. The statistical representation may represent the monitored environment as a whole or may represent specific subsets of rDNS requests originating from the monitored environment.

Using the first example from above, at 1104, the baseline network activity for the monitored environment may be determined to be 600 rDNS requests in certain embodiments. In certain embodiments, the baseline network activity for the first example may be more granular and it may be determined that 400 rDNS requests are made by VCN A on average, 100 rDNS requests are made by VCN B on average, and 100 rDNS requests are made by VCN C on average. One of ordinary skill in the art with the benefit of the present disclosure would recognize other ways in which a statistical baseline may be determined using the obtained augmented data for the monitored environment, not just using rDNS request counts, but using any combination of augmented data fields to form a specific baseline.

As has been discussed above and will be discussed in more detail below, the baseline network activity for the monitored environment, or a portion of the monitored environment, may be used to identify one or more components of the monitored environment that are experiencing unexpected network activity (e.g., potentially the target of malicious activity) and/or identify sources of unexpected network activity (e.g., malicious activity) targeted to at least a portion of the monitored environment.

The following is an example of how baseline network activity may be obtained for a scope of a VCN, however a similar technique may be carried out for other scopes. For each VCN identified at 1102 the baseline network activity for each VCN may be determined. In some embodiments, the baseline network activity is determined for a specified VCN.

Using the augmented data, the volume of rDNS requests originating from a single VCN and the IP addresses identified for lookup (e.g., the IP addresses used to look up the fully qualified domain name) in those requests is determined. The volume of rDNS requests originating from a single VCN may be determined by summing the total number of rDNS requests generated by the single VCN. The summing of the rDNS requests may be done on various bases, such as summing all rDNS requests, summing all rDNS requests that identified a unique IP address for lookup, summing all rDNS requests that identified a matching IP address for lookup, summing all rDNS requests based on another piece of information included in the augmented data, etc.

As a first example, during a first period of time, 400 rDNS requests originate from VCN A to look up IP address A, 100 rDNS requests originate from VCN A to look up IP address B, and 100 rDNS requests originate from VCN A to look up IP address C.

A baseline network activity for the VCN A may be determined for the first period of time. The baseline network activity may be a statistical representation of the rDNS requests originating from the VCN A. The statistical representation may represent the VCN A as a whole or may represent one or more specific subsets of rDNS requests originating from the VCN A.

Continuing the first example from above, the baseline for VCN A may be determined to be 600 rDNS requests in certain embodiments. In certain embodiments, the baseline may be determined to be that on average, VCN A makes 200 rDNS requests for any given lookup of an IP address. In certain embodiments, the baseline for the first example may be more granular and it may be determined that 400 rDNS requests look up IP address A on average, 100 rDNS requests look up IP address B on average, and 100 rDNS requests look up IP address C on average. One of ordinary skill in the art with the benefit of the present disclosure would recognize other ways in which a statistical baseline may be determined using the obtained augmented data on a per-VCN basis.

Similar baseline representations may be determined for a monitored environment of any scope (e.g., multiple VCNs, a region, multiple regions, etc.).

FIG. 12 depicts a simplified flow diagram for detecting irregular network behavior for a monitored environment, according to some embodiments. In the example embodiment depicted in FIG. 12, the processing depicted in flowchart 1200 may be performed by cloud defense system 708. Flowchart 1200 is an example of a baseline having a scope of a region that includes one or more VCNs and a target of a VCN within the monitored environment. However, embodiments that detect irregular activity at varying scopes of monitored environments are also considered, such as a monitored environment that includes more than one region, more than one customer, etc.

At 1202, augmented data for the monitored environment is obtained over a period of time. The augmented data may be obtained in a similar way as how it is obtained at 902, 904, 906, 908, above, for example. For example, rDNS requests originating from VCNs within the monitored environment may be used to generate augmented data.

At 1204, for each respective VCN (target) in the monitored environment (scope), 1206, 1208, 1210, 1212, and 1214 may be performed. Such steps compare augmented data from a target of the monitored environment with a baseline network activity for the monitored environment, represented by baseline augmented data for the monitored environment to determine if one or more actions should be performed. The steps performed may be an example of comparing augmented data for a specific target VCN within the scope of a monitored environment, the monitored environment including one or more VCNs (e.g., a region), against a baseline (e.g., obtained from the monitored environment, a portion of the monitored environment, or another monitored environment). Any number of baselines may be evaluated for each target and any number of targets equal to or less than the system component count included within the scope may be evaluated for one or more irregularities.

At 1206, using the augmented data gathered from monitoring the environment during 1202, a number of rDNS requests originating from the respective VCN over a period of time may be determined. The period of time may be the same period of time (e.g., same amount of time, same time of day) or a similar period of time (e.g., 1.2 hours compared to 1 hour) as observed when obtaining the baseline augmented data for the baseline network activity.

At 1208, the information determined during 1206 and the baseline for the monitored environment may be compared. Any portion(s) of data within the augmented data gathered during 1202 relating to the respective VCN of the monitored environment may then be compared with the baseline for the monitored environment, a portion thereof (e.g., a VCN thereof, the same respective VCN).

At 1210, based on the comparison performed during 1208, comparing the monitored environment with the baseline network activity for the monitored environment, a determination is made as to whether an irregularity exists.

An irregularity may be determined to exist if the baseline is sufficiently different from the augmented data obtained from at least a portion of the monitored environment. For example, the average number of rDNS requests for at least a portion of the monitored environment (e.g., for a specific VCN) may be compared with at least a portion of the baseline (e.g., the baseline average VCN rDNS request count for the environment or the baseline for the specific VCN). Any of the baseline network activity augmented data gathered from the processes performed in FIG. 11 may be used to compare with the augmented data information determined at 1206 which pertains to the monitored environment.

Further, a baseline network activity may be determined to be sufficiently different from a monitored environment using at least one of various measures. One measure may be whether a respective VCN from the monitored environment is sending a number of rDNS requests that is a magnitude higher (e.g., two times higher, one and a half times higher) or lower than the baseline for the VCN and/or monitored environment. Another measure may be whether a respective VCN from the monitored environment is sending a number of rDNS requests that is a defined value higher (e.g., 100 requests higher) or lower than the baseline for the VCN and/or monitored environment. Another measure may be whether a respective VCN from the monitored environment is sending a number of rDNS requests to lookup a particular IP address that is sufficiently higher than the baseline (e.g., the baseline for the particular IP address), a particular IP address that is sufficiently higher than the baseline for the particular VCN making the request, and/or a particular IP address that is sufficiently higher than the baseline for the particular monitored environment making the request. Another measure may use a standard deviation of a value in the obtained augmented data compared to the baseline of the corresponding value for the monitored environment of a portion thereof.

Various other conditions and combinations of conditions may be used for comparing one or more values from the augmented data with the baseline to determine which activity should be defined as irregular and help provide insight into the activity that is occurring within the monitored environment.

Such conditions may be capable of determining irregular behavior compared to the baseline. Such as, but not limited to, scanning from new sources, drop offs in scanning from sources, sources of denial-of-service attacks, and/or insider threats.

At 1212, if no irregularity was detected to exist during 1210, then the monitoring of the monitored environment may continue by returning to 1202. If an irregularity was detected to exist during 1210, then one or more actions may be initiated in response during 1214.

1214 may be performed if an irregularity was detected in the monitored environment during 1210. In some embodiments, if an irregularity was detected not to exist, then an action may still be performed, such as by reducing restrictions on system access to the network. If an irregularity was detected, then a signal may be output that identifies the irregularity. The signal may be an email, text, or other transmission.

As a result of the output signal in 1214, any number of actions may be performed during 1216. In certain embodiments, system configurations may occur such as configuring a router to drop packets, configuring a firewall, configuring a VCN to drop packets, configuring a VCN to add to a blocklist, generating a report, logging at least a portion of augmented data from the monitored environment, transmitting a communication, cutting off a VCN from the network, or other similar actions to prevent a known attacker from sending packets into the monitored environment or a network associated with the monitored environment.

A process similar to the one described with respect to flowchart 1200 may also be applied to different targets and/or scopes of a monitored environment and therefore allow for fine grained control of baselines, appropriate baseline thresholds deviations, targets, scopes, and actions.

Figure 13B:
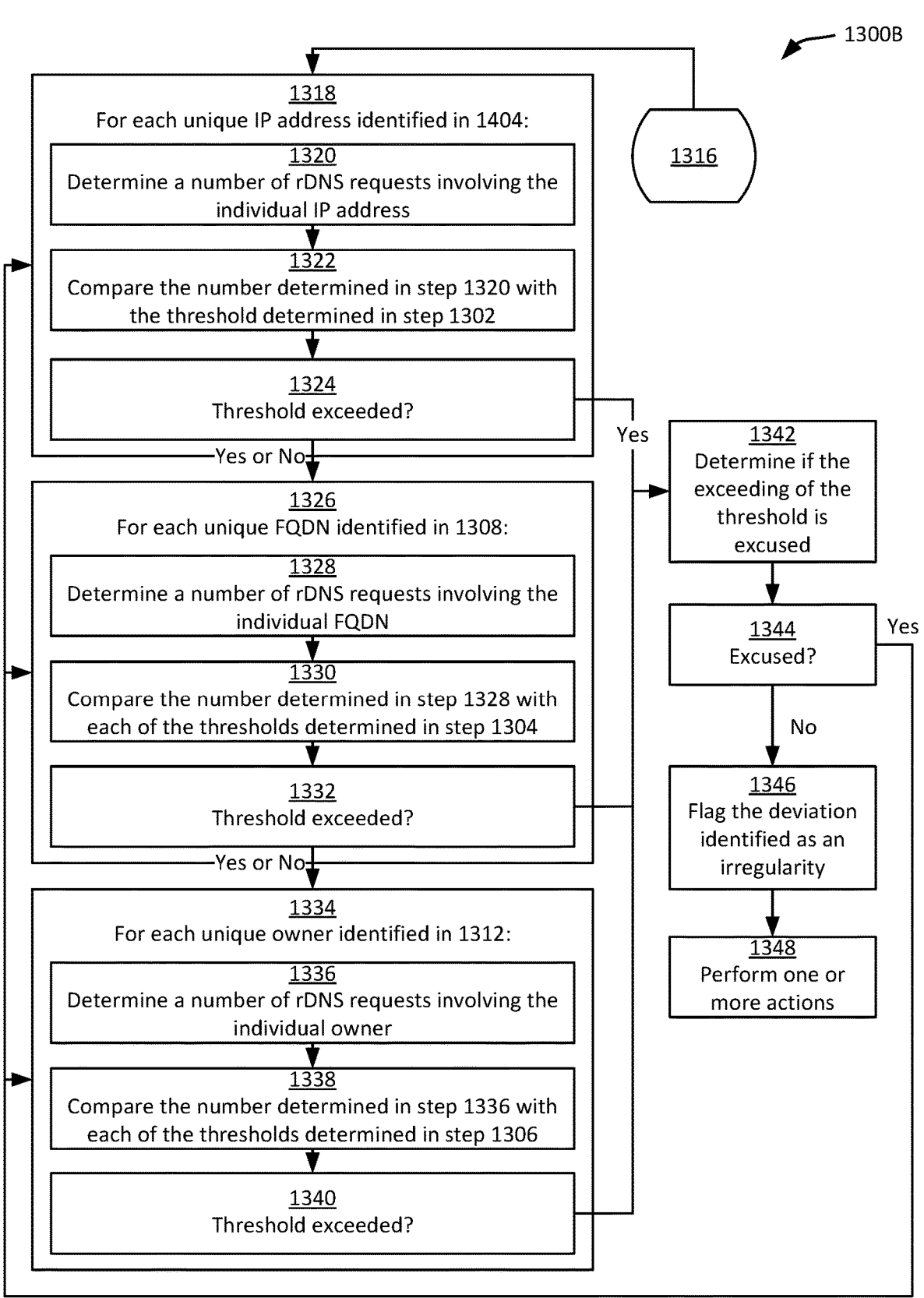

FIGS. 13A-13B depicts a simplified flow diagram for detecting malicious actors using a cloud defense system, according to some embodiments. The simplified flow diagram may be used to determine actors that are acting in unexpected ways (e.g., maliciously) with respect to a VCN, region, CSPI, or multiple CSPIs. In the example embodiment depicted in FIG. 13, the processing depicted in flowchart 1300 may be performed by cloud defense system 708.

At 1302, an IP address level threshold is determined for rDNS requests. The IP address level threshold may be based on a predetermined IP address level threshold value (e.g., user specified), and/or a baseline value of rDNS requests. For example, the IP address level threshold value may be 500 rDNS requests relating to an individual IP address for the environment. A first IP address level threshold for a first IP address may be the same or different threshold value compared to a second IP address level threshold for a second IP address.

At 1304, a FQDN level threshold is determined for being associated with the rDNS requests. The FQDN level threshold may be based on a predetermined FQDN level threshold value (e.g., user specified), and/or a baseline FQDN level threshold value of rDNS requests. For example, the FQDN level threshold value may be 500 rDNS requests relating to a first FQDN for the environment. A first FQDN level threshold for a first FQDN may be the same or different threshold value compared to a second FQDN level threshold for a second FQDN.

At 1306, an owner level threshold is determined for being associated with the rDNS requests. The owner threshold may be based on a predetermined owner threshold value (e.g., user specified), and/or a baseline owner threshold value of rDNS requests. For example, the owner threshold value may be 500 rDNS requests relating to a first owner for the environment. A first owner level threshold for a first owner may be the same or different threshold value compared to a second owner level threshold for a second owner.

At 1308, augmented data is obtained for a monitored environment. The augmented data may be obtained by monitoring the monitored environment over a period of time. The monitored data may reflect network traffic for a period of time (e.g., of the monitored environment, of a portion of the monitored environment, of a different environment). The augmented data may be obtained by using data obtained from rDNS requests and/or responses to rDNS requests.

At 1310, using the augmented data, a set of one or more unique IP addresses that are involved in one or more rDNS requests may be identified. In some embodiments, the set of one or more IP addresses identified are a subset of the IP addresses involved in all of the rDNS requests. For example, the subset may be determined based on the TSIG, the VCN, the region, etc. This may be because in some embodiments, it may be desirable not to analyze certain rDNS requests (e.g., additional privacy is desired). The identified IP addresses may later be used to cluster augmented data related to each IP address (e.g., to determine how many rDNS requests relate to each IP address).

At 1312, using the augmented data (e.g., the set of one or more IP addresses), a set of one or more unique fully qualified domain names (FQDNs) that are involved in one or more rDNS requests may be identified (e.g., as indicated rDNS request responses). Each FQDN may have been returned from a DNS resolver in response to the DNS request that included an IP address that was associated with the FQDN. The identified FQDNss may then be used to cluster augmented data related to each FQDN (e.g., to determine how many rDNS requests relate to each FQDN).

At 1314, using the augmented data (e.g., the set of one or more IP addresses, the set of one or more unique FQDNs), a set of one or more owners that are involved in one or more rDNS requests may be identified (e.g., using a whois IP lookup, using an obtained database of IP owners, using an obtained database of FQDN owners). The identified one or more owners may then be used to cluster augmented data related to each owner (e.g., to determine how many rDNS requests relate to each owner).

1316 illustrates a connection between the process described in FIG. 13A with the process described in FIG. 13B.

At 1318, for each unique IP address identified at 1310, processing 1320, 1322, and 1322 may be performed.

At 1320, a number of rDNS requests involving the unique IP address may be determined using the augmented data associated with the unique IP address.

At 1322, a comparison between the number of rDNS requests involving the unique IP address (determined at 1320) and the IP level threshold determined at 1302 may be performed.

Accordingly, it may be determined if the number of rDNS requests involving the unique IP address is above or below the IP level threshold (e.g., by a certain amount).

At 1324, a determination is made as to whether the IP level threshold has been exceeded for the unique IP address.

If the IP level threshold was not exceeded, then processing may continue, such as by checking if another threshold has been exceeded (e.g., a different IP address' IP level threshold, a fully qualified domain name level threshold, an owner level threshold), and/or by continuing to monitor the environment (e.g., performing 1308).

If the IP level threshold was exceeded, 1342 may be performed.

At 1342, a determination of whether the threshold (e.g., IP level threshold, FQDN level threshold, owner level threshold) should be excused. In certain embodiments, exceeding the threshold may be excused if the corresponding IP address, FQDN, and/or owner is on an allow list, and/or is not on a block list.

In certain embodiments, exceeding the threshold may be excused if a VCN is part of a "listening post" or "signals collection" honeypot, then the VCN could be treated as a control compared to other VCNs that might have alerting and responsive actions preprogrammed.

In certain embodiments, if observed network activity behavior fits a pattern of interest, (e.g., a predictable walk of a prefix, known attacker profiling of hosts associated with the same namespace), the observed network activity behavior may be excused.

In certain embodiments, conditions for excusing observed network activity may be set based on information regarding the result of blocking the observed network activity (e.g., instead of blocking the activity, it may be deemed more valuable to use a honeypot to gather information about the observed network activity). Thus, by excusing certain network activity exceeding thresholds, the excused network activity may allow for further insights to help manage subsequent network activity.

If it is determined at 1342 that there is a valid excuse for the threshold being exceeded, then 1344 may return to the process of checking if another threshold has been exceeded (e.g., a different IP address' IP level threshold, a FQDN level threshold, an owner level threshold), and/or by continuing to monitor the environment (e.g., performing 1308).

If it is determined at 1342 that there is not a valid excuse for the threshold being exceeded, then at 1348 one or more action may be performed. In certain embodiments, an action may be generating a report, transmitting a report, configuring a firewall, taking a system (e.g., VCN, region, CSPI, host machine) offline, adding to a block list, and/or configuring packets to be dropped.

After any actions are performed, checking if another threshold has been exceeded (e.g., a different IP address' IP level threshold, a FQDN level threshold, an owner level threshold) may be performed, and/or by monitoring the environment (e.g., performing 1308) may continue.

At 1326, for each unique FQDN identified at 1312, processing 1328, 1330, and 1332 may be performed.

At 1328, a number of rDNS requests involving the unique FQDN may be determined using the augmented data associated with the FQDN. The FQDN may be included in the rDNS request response.

At 1330, a comparison between the number of rDNS requests involving the FQDN (determined at 1328) and the FQDN level threshold determined at 1304 may be performed.

Accordingly, it may be determined if the number of rDNS requests involving the unique FQDN is above or below the FQDN level threshold (e.g., by a certain amount).

At 1332, a determination is made as to whether the FQDN level threshold has been exceeded for the unique FQDN.

If the FQDN level threshold was not exceeded, then processing may continue, such as by checking if another threshold has been exceeded (e.g., a different FQDN's FQDN level threshold, an IP address level threshold, an owner level threshold), and/or by continuing to monitor the environment (e.g., performing 1308).

If the FQDN level threshold was exceeded, 1342 may be performed. Processing performed at 1342 has already been described above.

At 1334, for each unique owner identified at 1314, processing 1336, 1338, and 1340 may be performed.

At 1336, a number of rDNS requests involving the unique owner may be determined using the augmented data associated with the unique owner. The owner may be associated with the FQDN included in the rDNS request response and/or the IP address that is the subject of the rDNS request.

At 1338, a comparison between the number of rDNS requests involving the owner (determined at 1336) and the owner level threshold determined at 1314 may be performed. Accordingly, it may be determined if the number of rDNS requests involving the unique owner is above or below the owner level threshold (e.g., by a certain amount).

At 1340, a determination is made as to whether the owner level threshold has been exceeded for the unique owner.

If the owner level threshold was not exceeded, then processing may continue, such as by checking if another threshold has been exceeded (e.g., a different owner's owner level threshold, an IP address level threshold, a FQDN level threshold), and/or by continuing to monitor the environment (e.g., performing 1308).

If the owner level threshold was exceeded, 1342 may be performed. Processing performed at 1342 has already been described above.

The systems described herein may comprise multiple systems communicatively coupled to each other via one or more communication networks. Further, the illustrated techniques are merely examples and are not intended to unduly limit the scope of claimed embodiments. Many variations, alternatives, and modifications are possible for the illustrated and described techniques. The systems, subsystems, and other components depicted may be implemented in software (e.g., code, instructions, program) executed by one or more processing units (e.g., processors, cores) of the respective systems, using hardware, or combinations thereof. The software may be stored on a non-transitory storage medium (e.g., on a memory device).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 14:
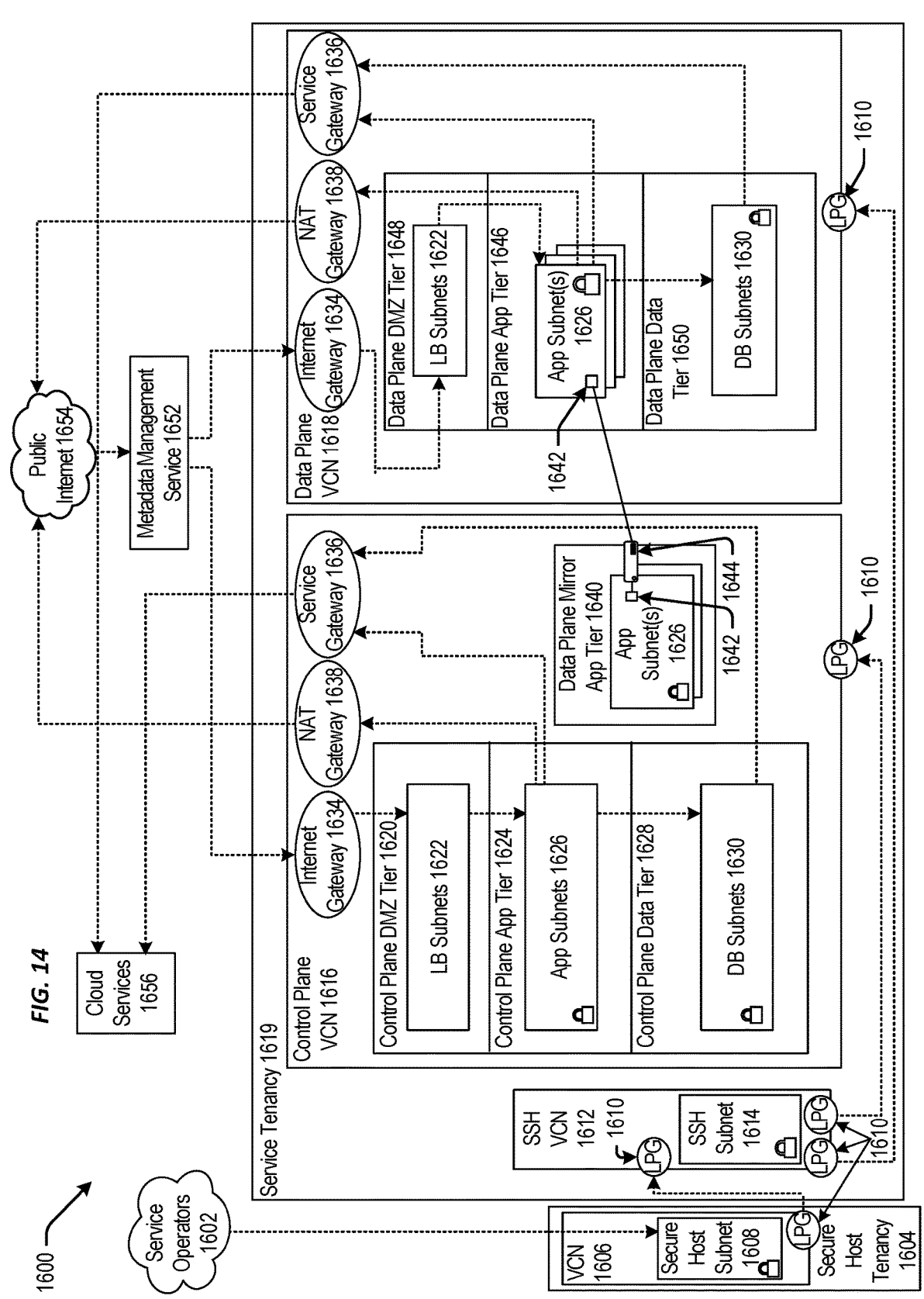
FIG. 14 is a block diagram illustrating one pattern for implementing a cloud infrastructure as a service system, according to at least one embodiment.

FIG. 14 is a block diagram 1600 illustrating an example pattern of an IaaS architecture, according to at least one embodiment. Service operators 1602 can be communicatively coupled to a secure host tenancy 1604 that can include a virtual cloud network (VCN) 1606 and a secure host subnet 1608. In some examples, the service operators 1602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1606 and/or the Internet.

The VCN 1606 can include a local peering gateway (LPG) 1610 that can be communicatively coupled to a secure shell (SSH) VCN 1612 via an LPG 1610 contained in the SSH VCN 1612. The SSH VCN 1612 can include an SSH subnet 1614, and the SSH VCN 1612 can be communicatively coupled to a control plane VCN 1616 via the LPG 1610 contained in the control plane VCN 1616. Also, the SSH VCN 1612 can be communicatively coupled to a data plane VCN 1618 via an LPG 1610. The control plane VCN 1616 and the data plane VCN 1618 can be contained in a service tenancy 1619 that can be owned and/or operated by the IaaS provider.

The control plane VCN 1616 can include a control plane demilitarized zone (DMZ) tier 1620 that acts as a perimeter network (e.g., portions of a corporate network between the corporate intranet and external networks). The DMZ-based servers may have restricted responsibilities and help keep breaches contained. Additionally, the DMZ tier 1620 can include one or more load balancer (LB) subnet(s) 1622, a control plane app tier 1624 that can include app subnet(s) 1626, a control plane data tier 1628 that can include database (DB) subnet(s) 1630 (e.g., frontend DB subnet(s) and/or backend DB subnet(s)). The LB subnet(s) 1622 contained in the control plane DMZ tier 1620 can be communicatively coupled to the app subnet(s) 1626 contained in the control plane app tier 1624 and an Internet gateway 1634 that can be contained in the control plane VCN 1616, and the app subnet(s) 1626 can be communicatively coupled to the DB subnet(s) 1630 contained in the control plane data tier 1628 and a service gateway 1636 and a network address translation (NAT) gateway 1638. The control plane VCN 1616 can include the service gateway 1636 and the NAT gateway 1638.

The control plane VCN 1616 can include a data plane mirror app tier 1640 that can include app subnet(s) 1626. The app subnet(s) 1626 contained in the data plane mirror app tier 1640 can include a virtual network interface controller (VNIC) 1642 that can execute a compute instance 1644. The compute instance 1644 can communicatively couple the app subnet(s) 1626 of the data plane mirror app tier 1640 to app subnet(s) 1626 that can be contained in a data plane app tier 1646.

The data plane VCN 1618 can include the data plane app tier 1646, a data plane DMZ tier 1648, and a data plane data tier 1650. The data plane DMZ tier 1648 can include LB subnet(s) 1622 that can be communicatively coupled to the app subnet(s) 1626 of the data plane app tier 1646 and the Internet gateway 1634 of the data plane VCN 1618. The app subnet(s) 1626 can be communicatively coupled to the service gateway 1636 of the data plane VCN 1618 and the NAT gateway 1638 of the data plane VCN 1618. The data plane data tier 1650 can also include the DB subnet(s) 1630 that can be communicatively coupled to the app subnet(s) 1626 of the data plane app tier 1646.

The Internet gateway 1634 of the control plane VCN 1616 and of the data plane VCN 1618 can be communicatively coupled to a metadata management service 1652 that can be communicatively coupled to public Internet 1654. Public Internet 1654 can be communicatively coupled to the NAT gateway 1638 of the control plane VCN 1616 and of the data plane VCN 1618. The service gateway 1636 of the control plane VCN 1616 and of the data plane VCN 1618 can be communicatively couple to cloud services 1656.

In some examples, the service gateway 1636 of the control plane VCN 1616 or of the data plane VCN 1618 can make application programming interface (API) calls to cloud services 1656 without going through public Internet 1654. The API calls to cloud services 1656 from the service gateway 1636 can be one-way: the service gateway 1636 can make API calls to cloud services 1656, and cloud services 1656 can send requested data to the service gateway 1636. But, cloud services 1656 may not initiate API calls to the service gateway 1636.

In some examples, the secure host tenancy 1604 can be directly connected to the service tenancy 1619, which may be otherwise isolated. The secure host subnet 1608 can communicate with the SSH subnet 1614 through an LPG 1610 that may enable two-way communication over an otherwise isolated system. Connecting the secure host subnet 1608 to the SSH subnet 1614 may give the secure host subnet 1608 access to other entities within the service tenancy 1619.

The control plane VCN 1616 may allow users of the service tenancy 1619 to set up or otherwise provision desired resources. Desired resources provisioned in the control plane VCN 1616 may be deployed or otherwise used in the data plane VCN 1618. In some examples, the control plane VCN 1616 can be isolated from the data plane VCN 1618, and the data plane mirror app tier 1640 of the control plane VCN 1616 can communicate with the data plane app tier 1646 of the data plane VCN 1618 via VNICs 1642 that can be contained in the data plane mirror app tier 1640 and the data plane app tier 1646.

In some examples, users of the system, or customers, can make requests, for example create, read, update, or delete (CRUD) operations, through public Internet 1654 that can communicate the requests to the metadata management service 1652. The metadata management service 1652 can communicate the request to the control plane VCN 1616 through the Internet gateway 1634. The request can be received by the LB subnet(s) 1622 contained in the control plane DMZ tier 1620. The LB subnet(s) 1622 may determine that the request is valid, and in response to this determination, the LB subnet(s) 1622 can transmit the request to app subnet(s) 1626 contained in the control plane app tier 1624. If the request is validated and requires a call to public Internet 1654, the call to public Internet 1654 may be transmitted to the NAT gateway 1638 that can make the call to public Internet 1654. Metadata that may be desired to be stored by the request can be stored in the DB subnet(s) 1630.

In some examples, the data plane mirror app tier 1640 can facilitate direct communication between the control plane VCN 1616 and the data plane VCN 1618. For example, changes, updates, or other suitable modifications to configuration may be desired to be applied to the resources contained in the data plane VCN 1618. Via a VNIC 1642, the control plane VCN 1616 can directly communicate with, and can thereby execute the changes, updates, or other suitable modifications to configuration to, resources contained in the data plane VCN 1618.

In some embodiments, the control plane VCN 1616 and the data plane VCN 1618 can be contained in the service tenancy 1619. In this case, the user, or the customer, of the system may not own or operate either the control plane VCN 1616 or the data plane VCN 1618. Instead, the IaaS provider may own or operate the control plane VCN 1616 and the data plane VCN 1618, both of which may be contained in the service tenancy 1619. This embodiment can enable isolation of networks that may prevent users or customers from interacting with other users', or other customers', resources. Also, this embodiment may allow users or customers of the system to store databases privately without needing to rely on public Internet 1654, which may not have a desired level of threat prevention, for storage.

In other embodiments, the LB subnet(s) 1622 contained in the control plane VCN 1616 can be configured to receive a signal from the service gateway 1636. In this embodiment, the control plane VCN 1616 and the data plane VCN 1618 may be configured to be called by a customer of the IaaS provider without calling public Internet 1654. Customers of the IaaS provider may desire this embodiment since database(s) that the customers use may be controlled by the IaaS provider and may be stored on the service tenancy 1619, which may be isolated from public Internet 1654.

Figure 15:
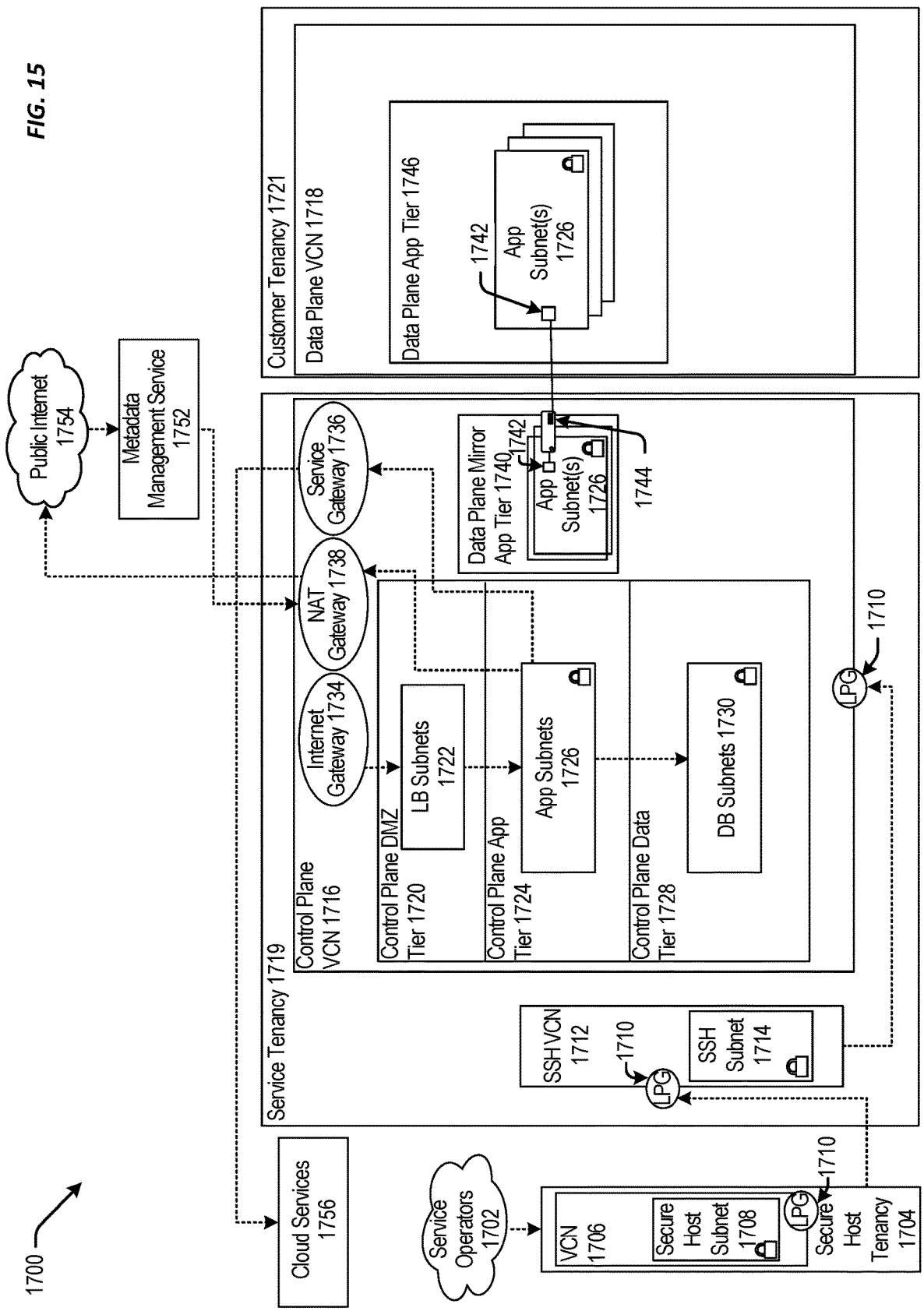
FIG. 15 is a block diagram illustrating another pattern for implementing a cloud infrastructure as a service system, according to at least one embodiment.

FIG. 15 is a block diagram 1700 illustrating another example pattern of an IaaS architecture, according to at least one embodiment. Service operators 1702 (e.g., service operators 1602 of FIG. 14) can be communicatively coupled to a secure host tenancy 1704 (e.g., the secure host tenancy 1604 of FIG. 14) that can include a virtual cloud network (VCN) 1706 (e.g., the VCN 1606 of FIG. 14) and a secure host subnet 1708 (e.g., the secure host subnet 1608 of FIG. 14). The VCN 1706 can include a local peering gateway (LPG) 1710 (e.g., the LPG 1610 of FIG. 14) that can be communicatively coupled to a secure shell (SSH) VCN 1712 (e.g., the SSH VCN 1612 of FIG. 14) via an LPG 1610 contained in the SSH VCN 1712. The SSH VCN 1712 can include an SSH subnet 1714 (e.g., the SSH subnet 1614 of FIG. 14), and the SSH VCN 1712 can be communicatively coupled to a control plane VCN 1716 (e.g., the control plane VCN 1616 of FIG. 14) via an LPG 1710 contained in the control plane VCN 1716. The control plane VCN 1716 can be contained in a service tenancy 1719 (e.g., the service tenancy 1619 of FIG. 14), and the data plane VCN 1718

(e.g., the data plane VCN 1618 of FIG. 14) can be contained in a customer tenancy 1721 that may be owned or operated by users, or customers, of the system.

The control plane VCN 1716 can include a control plane DMZ tier 1720 (e.g., the control plane DMZ tier 1620 of FIG. 14) that can include LB subnet(s) 1722 (e.g., LB subnet(s) 1622 of FIG. 14), a control plane app tier 1724 (e.g., the control plane app tier 1624 of FIG. 14) that can include app subnet(s) 1726 (e.g., app subnet(s) 1626 of FIG. 14), a control plane data tier 1728 (e.g., the control plane data tier 1628 of FIG. 14) that can include database (DB) subnet(s) 1730 (e.g., similar to DB subnet(s) 1630 of FIG. 14). The LB subnet(s) 1722 contained in the control plane DMZ tier 1720 can be communicatively coupled to the app subnet(s) 1726 contained in the control plane app tier 1724 and an Internet gateway 1734 (e.g., the Internet gateway 1634 of FIG. 14) that can be contained in the control plane VCN 1716, and the app subnet(s) 1726 can be communicatively coupled to the DB subnet(s) 1730 contained in the control plane data tier 1728 and a service gateway 1736 (e.g., the service gateway 1636 of FIG. 14) and a network address translation (NAT) gateway 1738 (e.g., the NAT gateway 1638 of FIG. 14). The control plane VCN 1716 can include the service gateway 1736 and the NAT gateway 1738.

The control plane VCN 1716 can include a data plane mirror app tier 1740 (e.g., the data plane mirror app tier 1640 of FIG. 14) that can include app subnet(s) 1726. The app subnet(s) 1726 contained in the data plane mirror app tier 1740 can include a virtual network interface controller (VNIC) 1742 (e.g., the VNIC of 1642) that can execute a compute instance 1744 (e.g., similar to the compute instance 1644 of FIG. 14). The compute instance 1744 can facilitate communication between the app subnet(s) 1726 of the data plane mirror app tier 1740 and the app subnet(s) 1726 that can be contained in a data plane app tier 1746 (e.g., the data plane app tier 1646 of FIG. 14) via the VNIC 1742 contained in the data plane mirror app tier 1740 and the VNIC 1742 contained in the data plane app tier 1746.

The Internet gateway 1734 contained in the control plane VCN 1716 can be communicatively coupled to a metadata management service 1752 (e.g., the metadata management service 1652 of FIG. 14) that can be communicatively coupled to public Internet 1754 (e.g., public Internet 1654 of FIG. 14). Public Internet 1754 can be communicatively coupled to the NAT gateway 1738 contained in the control plane VCN 1716. The service gateway 1736 contained in the control plane VCN 1716 can be communicatively couple to cloud services 1756 (e.g., cloud services 1656 of FIG. 14).

In some examples, the data plane VCN 1718 can be contained in the customer tenancy 1721. In this case, the IaaS provider may provide the control plane VCN 1716 for each customer, and the IaaS provider may, for each customer, set up a unique compute instance 1744 that is contained in the service tenancy 1719. Each compute instance 1744 may allow communication between the control plane VCN 1716, contained in the service tenancy 1719, and the data plane VCN 1718 that is contained in the customer tenancy 1721. The compute instance 1744 may allow resources, that are provisioned in the control plane VCN 1716 that is contained in the service tenancy 1719, to be deployed or otherwise used in the data plane VCN 1718 that is contained in the customer tenancy 1721.

In other examples, the customer of the IaaS provider may have databases that live in the customer tenancy 1721. In this example, the control plane VCN 1716 can include the data plane mirror app tier 1740 that can include app subnet (s) 1726. The data plane mirror app tier 1740 can reside in the data plane VCN 1718, but the data plane mirror app tier 1740 may not live in the data plane VCN 1718. That is, the data plane mirror app tier 1740 may have access to the customer tenancy 1721, but the data plane mirror app tier 1740 may not exist in the data plane VCN 1718 or be owned or operated by the customer of the IaaS provider. The data plane mirror app tier 1740 may be configured to make calls to the data plane VCN 1718 but may not be configured to make calls to any entity contained in the control plane VCN 1716. The customer may desire to deploy or otherwise use resources in the data plane VCN 1718 that are provisioned in the control plane VCN 1716, and the data plane mirror app tier 1740 can facilitate the desired deployment, or other usage of resources, of the customer.

In some embodiments, the customer of the IaaS provider can apply filters to the data plane VCN 1718. In this embodiment, the customer can determine what the data plane VCN 1718 can access, and the customer may restrict access to public Internet 1754 from the data plane VCN 1718. The IaaS provider may not be able to apply filters or otherwise control access of the data plane VCN 1718 to any outside networks or databases. Applying filters and controls by the customer onto the data plane VCN 1718, contained in the customer tenancy 1721, can help isolate the data plane VCN 1718 from other customers and from public Internet 1754.

In some embodiments, cloud services 1756 can be called by the service gateway 1736 to access services that may not exist on public Internet 1754, on the control plane VCN 1716, or on the data plane VCN 1718. The connection between cloud services 1756 and the control plane VCN 1716 or the data plane VCN 1718 may not be live or continuous. Cloud services 1756 may exist on a different network owned or operated by the IaaS provider. Cloud services 1756 may be configured to receive calls from the service gateway 1736 and may be configured to not receive calls from public Internet 1754. Some cloud services 1756 may be isolated from other cloud services 1756, and the control plane VCN 1716 may be isolated from cloud services 1756 that may not be in the same region as the control plane VCN 1716. For example, the control plane VCN 1716 may be located in "Region 1," and cloud service "Deployment 16," may be located in Region 1 and in "Region 2." If a call to Deployment 16 is made by the service gateway 1736 contained in the control plane VCN 1716 located in Region 1, the call may be transmitted to Deployment 16 in Region 1. In this example, the control plane VCN 1716, or Deployment 16 in Region 1, may not be communicatively coupled to, or otherwise in communication with, Deployment 16 in Region 2.

Figure 16:
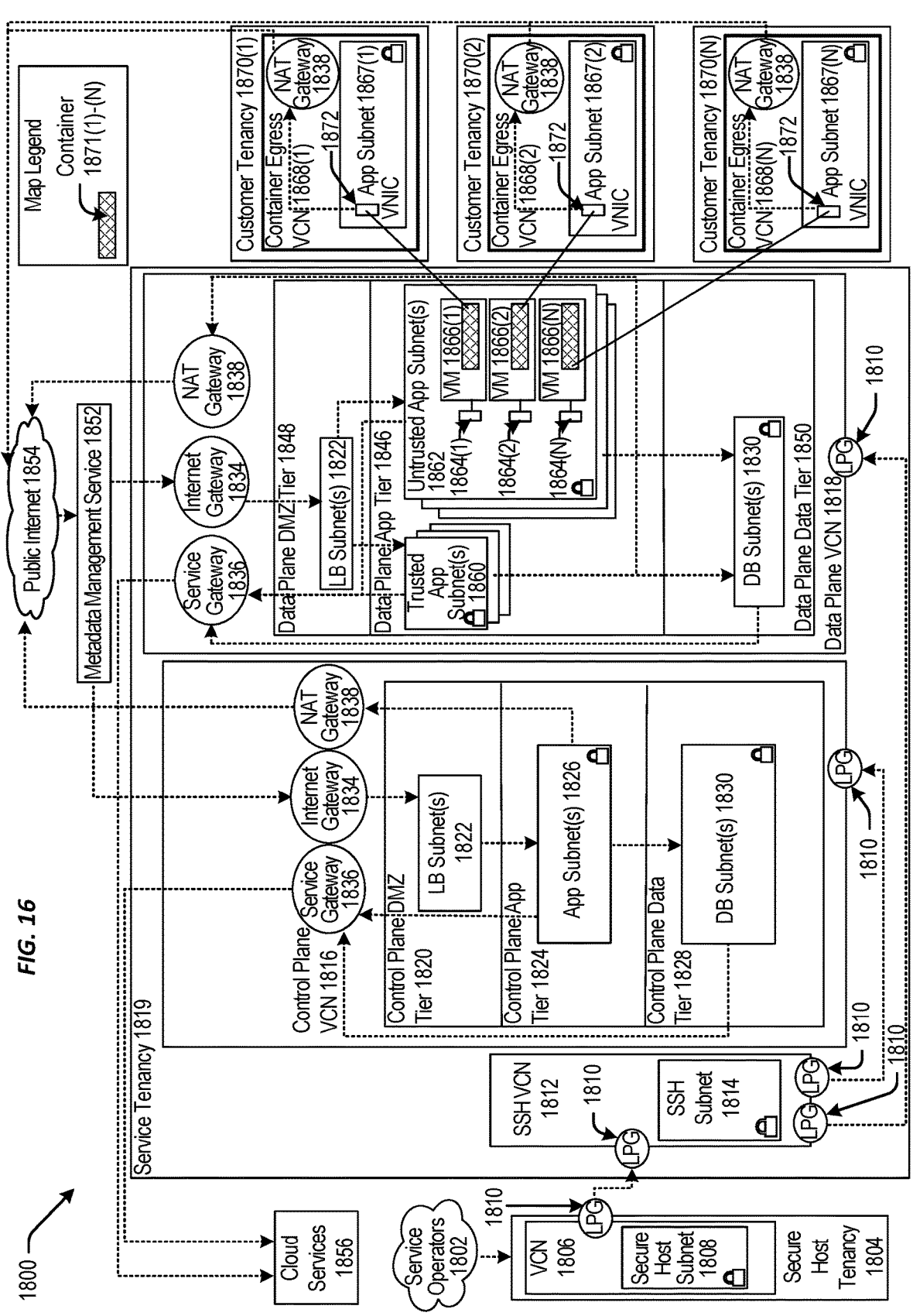
FIG. 16 is a block diagram illustrating another pattern for implementing a cloud infrastructure as a service system, according to at least one embodiment.

FIG. 16 is a block diagram 1800 illustrating another example pattern of an IaaS architecture, according to at least one embodiment. Service operators 1802 (e.g., service operators 1602 of FIG. 14) can be communicatively coupled to a secure host tenancy 1804 (e.g., the secure host tenancy 1604 of FIG. 14) that can include a virtual cloud network (VCN) 1806 (e.g., the VCN 1606 of FIG. 14) and a secure host subnet 1808 (e.g., the secure host subnet 1608 of FIG. 14). The VCN 1806 can include an LPG 1810 (e.g., the LPG 1610 of FIG. 14) that can be communicatively coupled to an SSH VCN 1812 (e.g., the SSH VCN 1612 of FIG. 14) via an LPG 1810 contained in the SSH VCN 1812. The SSH VCN 1812 can include an SSH subnet 1814 (e.g., the SSH subnet 1614 of FIG. 14), and the SSH VCN 1812 can be communicatively coupled to a control plane VCN 1816 (e.g., the control plane VCN 1616 of FIG. 14) via an LPG

1810 contained in the control plane VCN 1816 and to a data plane VCN 1818 (e.g., the data plane 1618 of FIG. 14) via an LPG 1810 contained in the data plane VCN 1818. The control plane VCN 1816 and the data plane VCN 1818 can be contained in a service tenancy 1819 (e.g., the service tenancy 1619 of FIG. 14).

The control plane VCN 1816 can include a control plane DMZ tier 1820 (e.g., the control plane DMZ tier 1620 of FIG. 14) that can include load balancer (LB) subnet(s) 1822 (e.g., LB subnet(s) 1622 of FIG. 14), a control plane app tier 1824 (e.g., the control plane app tier 1624 of FIG. 14) that can include app subnet(s) 1826 (e.g., similar to app subnet(s) 1626 of FIG. 14), a control plane data tier 1828 (e.g., the control plane data tier 1628 of FIG. 14) that can include DB subnet(s) 1830. The LB subnet(s) 1822 contained in the control plane DMZ tier 1820 can be communicatively coupled to the app subnet(s) 1826 contained in the control plane app tier 1824 and to an Internet gateway 1834 (e.g., the Internet gateway 1634 of FIG. 14) that can be contained in the control plane VCN 1816, and the app subnet(s) 1826 can be communicatively coupled to the DB subnet(s) 1830 contained in the control plane data tier 1828 and to a service gateway 1836 (e.g., the service gateway of FIG. 14) and a network address translation (NAT) gateway 1838 (e.g., the NAT gateway 1638 of FIG. 14). The control plane VCN 1816 can include the service gateway 1836 and the NAT gateway 1838.

The data plane VCN 1818 can include a data plane app tier 1846 (e.g., the data plane app tier 1646 of FIG. 14), a data plane DMZ tier 1848 (e.g., the data plane DMZ tier 1648 of FIG. 14), and a data plane data tier 1850 (e.g., the data plane data tier 1650 of FIG. 14). The data plane DMZ tier 1848 can include LB subnet(s) 1822 that can be communicatively coupled to trusted app subnet(s) 1860 and untrusted app subnet(s) 1862 of the data plane app tier 1846 and the Internet gateway 1834 contained in the data plane VCN 1818. The trusted app subnet(s) 1860 can be communicatively coupled to the service gateway 1836 contained in the data plane VCN 1818, the NAT gateway 1838 contained in the data plane VCN 1818, and DB subnet(s) 1830 contained in the data plane data tier 1850. The untrusted app subnet(s) 1862 can be communicatively coupled to the service gateway 1836 contained in the data plane VCN 1818 and DB subnet(s) 1830 contained in the data plane data tier 1850. The data plane data tier 1850 can include DB subnet(s) 1830 that can be communicatively coupled to the service gateway 1836 contained in the data plane VCN 1818.

The untrusted app subnet(s) 1862 can include one or more primary VNICs 1864(1)-(N) that can be communicatively coupled to tenant virtual machines (VMs) 1866(1)-(N). Each tenant VM 1866(1)-(N) can be communicatively coupled to a respective app subnet 1867(1)-(N) that can be contained in respective container egress VCNs 1868(1)-(N) that can be contained in respective customer tenancies 1870(1)-(N). Respective secondary VNICs 1872(1)-(N) can facilitate communication between the untrusted app subnet(s) 1862 contained in the data plane VCN 1818 and the app subnet contained in the container egress VCNs 1868(1)-(N). Each container egress VCNs 1868(1)-(N) can include a NAT gateway 1838 that can be communicatively coupled to public Internet 1854 (e.g., public Internet 1654 of FIG. 14).

The Internet gateway 1834 contained in the control plane VCN 1816 and contained in the data plane VCN 1818 can be communicatively coupled to a metadata management service 1852 (e.g., the metadata management system 1652 of FIG. 14) that can be communicatively coupled to public Internet 1854. Public Internet 1854 can be communicatively coupled to the NAT gateway 1838 contained in the control plane VCN 1816 and contained in the data plane VCN 1818. The service gateway 1836 contained in the control plane VCN 1816 and contained in the data plane VCN 1818 can be communicatively couple to cloud services 1856.

In some embodiments, the data plane VCN 1818 can be integrated with customer tenancies 1870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1846. Code to run the function may be executed in the VMs 1866(1)-(N), and the code may not be configured to run anywhere else on the data plane VCN 1818. Each VM 1866(1)-(N) may be connected to one customer tenancy 1870. Respective containers 1871(1)-(N) contained in the VMs 1866(1)-(N) may be configured to run the code. In this case, there can be a dual isolation (e.g., the containers 1871(1)-(N) running code, where the containers 1871(1)-(N) may be contained in at least the VM 1866(1)-(N) that are contained in the untrusted app subnet(s) 1862), which may help prevent incorrect or otherwise undesirable code from damaging the network of the IaaS provider or from damaging a network of a different customer. The containers 1871(1)-(N) may be communicatively coupled to the customer tenancy 1870 and may be configured to transmit or receive data from the customer tenancy 1870. The containers 1871(1)-(N) may not be configured to transmit or receive data from any other entity in the data plane VCN 1818. Upon completion of running the code, the IaaS provider may kill or otherwise dispose of the containers 1871(1)-(N).

In some embodiments, the trusted app subnet(s) 1860 may run code that may be owned or operated by the IaaS provider. In this embodiment, the trusted app subnet(s) 1860 may be communicatively coupled to the DB subnet(s) 1830 and be configured to execute CRUD operations in the DB subnet(s) 1830. The untrusted app subnet(s) 1862 may be communicatively coupled to the DB subnet(s) 1830, but in this embodiment, the untrusted app subnet(s) may be configured to execute read operations in the DB subnet(s) 1830. The containers 1871(1)-(N) that can be contained in the VM 1866(1)-(N) of each customer and that may run code from the customer may not be communicatively coupled with the DB subnet(s) 1830.

In other embodiments, the control plane VCN 1816 and the data plane VCN 1818 may not be directly communicatively coupled. In this embodiment, there may be no direct communication between the control plane VCN 1816 and the data plane VCN 1818. However, communication can occur indirectly through at least one method. An LPG 1810 may be established by the IaaS provider that can facilitate communication between the control plane VCN 1816 and the data plane VCN 1818. In another example, the control plane VCN 1816 or the data plane VCN 1818 can make a call to cloud services 1856 via the service gateway 1836. For example, a call to cloud services 1856 from the control plane VCN 1816 can include a request for a service that can communicate with the data plane VCN 1818.

Figure 17:
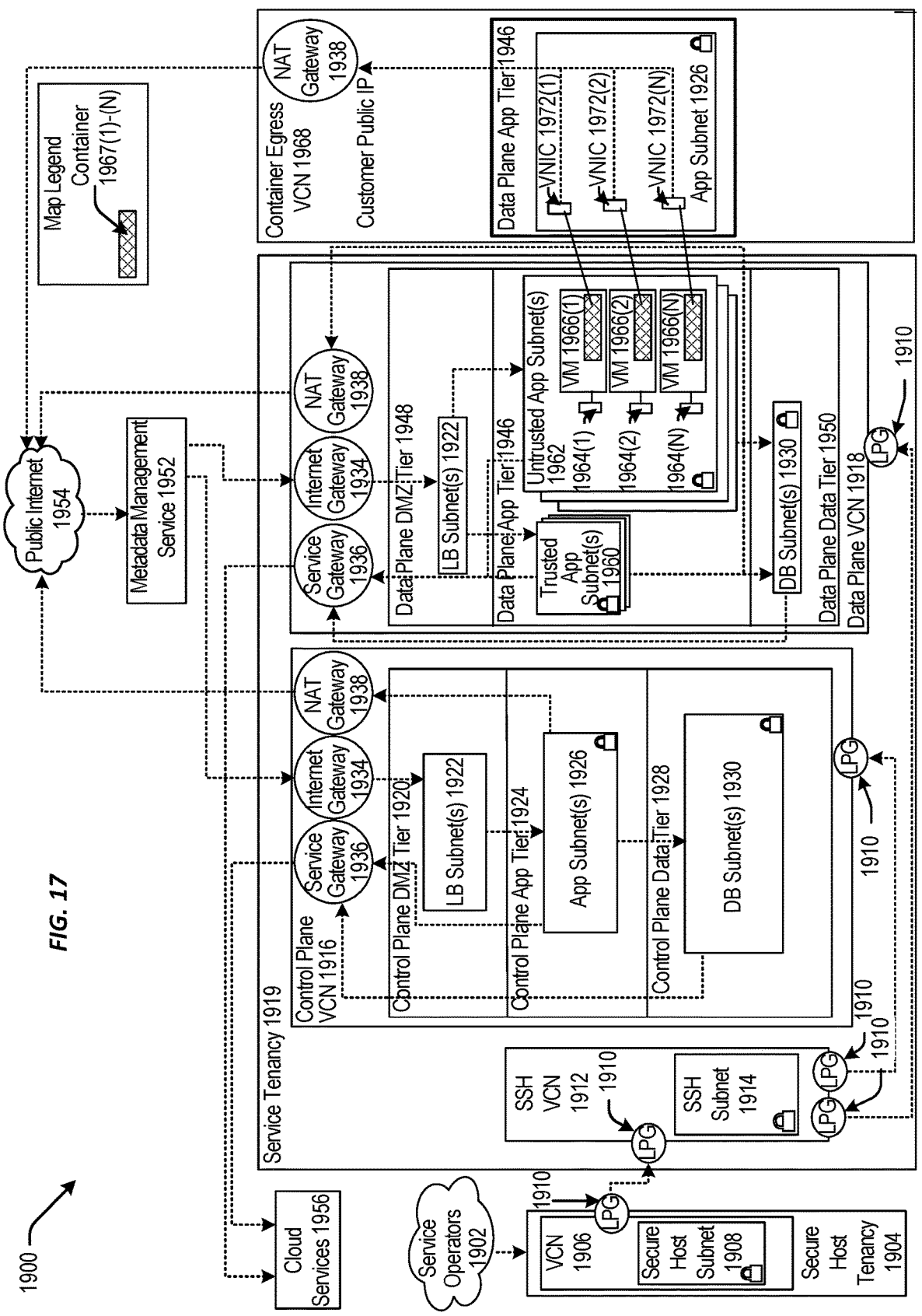
FIG. 17 is a block diagram illustrating another pattern for implementing a cloud infrastructure as a service system, according to at least one embodiment.

FIG. 17 is a block diagram 1900 illustrating another example pattern of an IaaS architecture, according to at least one embodiment. Service operators 1902 (e.g., service operators 1602 of FIG. 14) can be communicatively coupled to a secure host tenancy 1904 (e.g., the secure host tenancy 1604 of FIG. 14) that can include a virtual cloud network (VCN) 1906 (e.g., the VCN 1606 of FIG. 14) and a secure host subnet 1908 (e.g., the secure host subnet 1608 of FIG. 14). The VCN 1906 can include an LPG 1910 (e.g., the LPG 1610 of FIG. 14) that can be communicatively coupled to an SSH VCN 1912 (e.g., the SSH VCN 1612 of FIG. 14) via an LPG 1910 contained in the SSH VCN 1912. The SSH VCN 1912 can include an SSH subnet 1914 (e.g., the SSH subnet 1614 of FIG. 14), and the SSH VCN 1912 can be communicatively coupled to a control plane VCN 1916 (e.g., the control plane VCN 1616 of FIG. 14) via an LPG 1910 contained in the control plane VCN 1916 and to a data plane VCN 1918 (e.g., the data plane 1618 of FIG. 14) via an LPG 1910 contained in the data plane VCN 1918. The control plane VCN 1916 and the data plane VCN 1918 can be contained in a service tenancy 1919 (e.g., the service tenancy 1619 of FIG. 14).

The control plane VCN 1916 can include a control plane DMZ tier 1920 (e.g., the control plane DMZ tier 1620 of FIG. 14) that can include LB subnet(s) 1922 (e.g., LB subnet(s) 1622 of FIG. 14), a control plane app tier 1924 (e.g., the control plane app tier 1624 of FIG. 14) that can include app subnet(s) 1926 (e.g., app subnet(s) 1626 of FIG. 14), a control plane data tier 1928 (e.g., the control plane data tier 1628 of FIG. 14) that can include DB subnet(s) 1930 (e.g., DB subnet(s) 1830 of FIG. 14). The LB subnet(s) 1922 contained in the control plane DMZ tier 1920 can be communicatively coupled to the app subnet(s) 1926 contained in the control plane app tier 1924 and to an Internet gateway 1934 (e.g., the Internet gateway 1634 of FIG. 14) that can be contained in the control plane VCN 1916, and the app subnet(s) 1926 can be communicatively coupled to the DB subnet(s) 1930 contained in the control plane data tier 1928 and to a service gateway 1936 (e.g., the service gateway of FIG. 14) and a network address translation (NAT) gateway 1938 (e.g., the NAT gateway 1638 of FIG. 14). The control plane VCN 1916 can include the service gateway 1936 and the NAT gateway 1938.

The data plane VCN 1918 can include a data plane app tier 1946 (e.g., the data plane app tier 1646 of FIG. 14), a data plane DMZ tier 1948 (e.g., the data plane DMZ tier 1648 of FIG. 14), and a data plane data tier 1950 (e.g., the data plane data tier 1650 of FIG. 14). The data plane DMZ tier 1948 can include LB subnet(s) 1922 that can be communicatively coupled to trusted app subnet(s) 1960 (e.g., trusted app subnet(s) 1860 of FIG. 14) and untrusted app subnet(s) 1962 (e.g., untrusted app subnet(s) 1862 of FIG. 14) of the data plane app tier 1946 and the Internet gateway 1934 contained in the data plane VCN 1918. The trusted app subnet(s) 1960 can be communicatively coupled to the service gateway 1936 contained in the data plane VCN 1918, the NAT gateway 1938 contained in the data plane VCN 1918, and DB subnet(s) 1930 contained in the data plane data tier 1950. The untrusted app subnet(s) 1962 can be communicatively coupled to the service gateway 1936 contained in the data plane VCN 1918 and DB subnet(s) 1930 contained in the data plane data tier 1950. The data plane data tier 1950 can include DB subnet(s) 1930 that can be communicatively coupled to the service gateway 1936 contained in the data plane VCN 1918.

The untrusted app subnet(s) 1962 can include primary VNICs 1964(1)-(N) that can be communicatively coupled to tenant virtual machines (VMs) 1966(1)-(N) residing within the untrusted app subnet(s) 1962. Each tenant VM 1966(1)-(N) can run code in a respective container 1967(1)-(N), and be communicatively coupled to an app subnet 1926 that can be contained in a data plane app tier 1946 that can be contained in a container egress VCN 1968. Respective secondary VNICs 1972(1)-(N) can facilitate communication between the untrusted app subnet(s) 1962 contained in the data plane VCN 1918 and the app subnet contained in the container egress VCN 1968. The container egress VCN can include a NAT gateway 1938 that can be communicatively coupled to public Internet 1954 (e.g., public Internet 1654 of FIG. 14).

The Internet gateway 1934 contained in the control plane VCN 1916 and contained in the data plane VCN 1918 can be communicatively coupled to a metadata management service 1952 (e.g., the metadata management system 1652 of FIG. 14) that can be communicatively coupled to public Internet 1954. Public Internet 1954 can be communicatively coupled to the NAT gateway 1938 contained in the control plane VCN 1916 and contained in the data plane VCN 1918. The service gateway 1936 contained in the control plane VCN 1916 and contained in the data plane VCN 1918 can be communicatively couple to cloud services 1956.

In some examples, the pattern illustrated by the architecture of block diagram 1900 of FIG. 17 may be considered an exception to the pattern illustrated by the architecture of block diagram 1800 of FIG. 16 and may be desirable for a customer of the IaaS provider if the IaaS provider cannot directly communicate with the customer (e.g., a disconnected region). The respective containers 1967(1)-(N) that are contained in the VMs 1966(1)-(N) for each customer can be accessed in real-time by the customer. The containers 1967(1)-(N) may be configured to make calls to respective secondary VNICs 1972(1)-(N) contained in app subnet(s) 1926 of the data plane app tier 1946 that can be contained in the container egress VCN 1968. The secondary VNICs 1972(1)-(N) can transmit the calls to the NAT gateway 1938 that may transmit the calls to public Internet 1954. In this example, the containers 1967(1)-(N) that can be accessed in real-time by the customer can be isolated from the control plane VCN 1916 and can be isolated from other entities contained in the data plane VCN 1918. The containers 1967(1)-(N) may also be isolated from resources from other customers.

In other examples, the customer can use the containers 1967(1)-(N) to call cloud services 1956. In this example, the customer may run code in the containers 1967(1)-(N) that requests a service from cloud services 1956. The containers 1967(1)-(N) can transmit this request to the secondary VNICs 1972(1)-(N) that can transmit the request to the NAT gateway that can transmit the request to public Internet 1954. Public Internet 1954 can transmit the request to LB subnet(s) 1922 contained in the control plane VCN 1916 via the Internet gateway 1934. In response to determining the request is valid, the LB subnet(s) can transmit the request to app subnet(s) 1926 that can transmit the request to cloud services 1956 via the service gateway 1936.

It should be appreciated that IaaS architectures 1600, 1700, 1800, 1900 depicted in the figures may have other components than those depicted. Further, the embodiments shown in the figures are only some examples of a cloud infrastructure system that may incorporate certain embodiments of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 18:
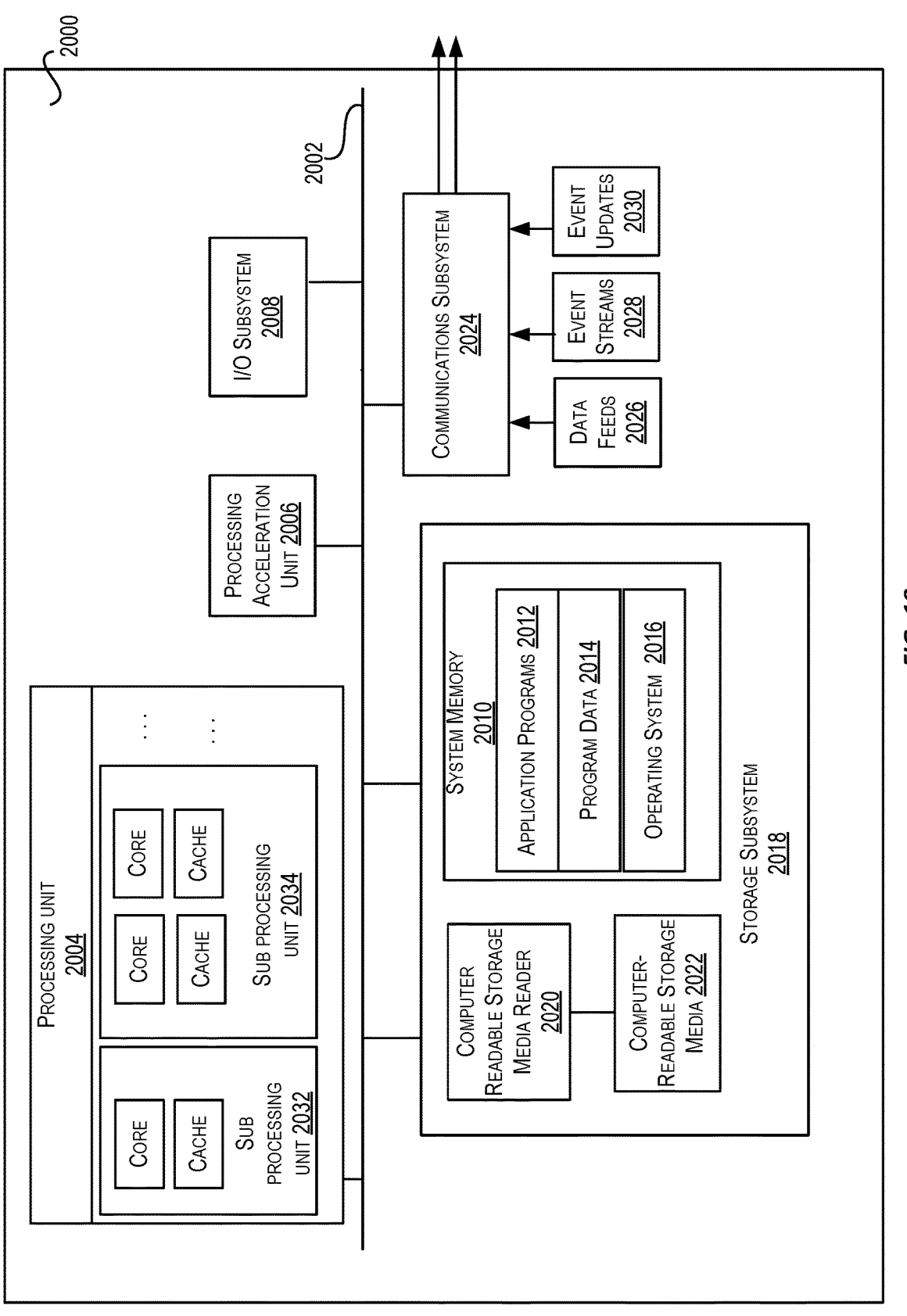
FIG. 18 is a block diagram illustrating an example computer system, according to at least one embodiment.

FIG. 18 illustrates an example computer system 2000, in which various embodiments may be implemented. The system 2000 may be used to implement any of the computer systems described above. As shown in the figure, computer system 2000 includes a processing unit 2004 that communicates with a number of peripheral subsystems via a bus subsystem 2002. These peripheral subsystems may include a processing acceleration unit 2006, an I/O subsystem 2008, a storage subsystem 2018 and a communications subsystem 2024. Storage subsystem 2018 includes tangible computer-readable storage media 2022 and a system memory 2010.

Bus subsystem 2002 provides a mechanism for letting the various components and subsystems of computer system 2000 communicate with each other as intended. Although bus subsystem 2002 is shown schematically as a single bus, alternative embodiments of the bus subsystem may utilize multiple buses. Bus subsystem 2002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2004, which can be implemented as one or more integrated circuits (e.g., a conventional microprocessor or microcontroller), controls the operation of computer system 2000. One or more processors may be included in processing unit 2004. These processors may include single core or multicore processors. In certain embodiments, processing unit 2004 may be implemented as one or more independent processing units 2032 and/or 2034 with single or multicore processors included in each processing unit. In other embodiments, processing unit 2004 may also be implemented as a quad-core processing unit formed by integrating two dual-core processors into a single chip.

In various embodiments, processing unit 2004 can execute a variety of programs in response to program code and can maintain multiple concurrently executing programs or processes. At any given time, some or all of the program code to be executed can be resident in processor(s) 2004 and/or in storage subsystem 2018. Through suitable programming, processor(s) 2004 can provide various functionalities described above. Computer system 2000 may additionally include a processing acceleration unit 2006, which can include a digital signal processor (DSP), a special-purpose processor, and/or the like.

I/O subsystem 2008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2000 may comprise a storage subsystem 2018 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 2004 provide the functionality described above. Storage subsystem 2018 may also provide a repository for storing data used in accordance with the present disclosure.

As depicted in the example in FIG. 18, storage subsystem 2018 can include various components including a system memory 2010, computer-readable storage media 2022, and a computer readable storage media reader 2020. System memory 2010 may store program instructions that are loadable and executable by processing unit 2004. System memory 2010 may also store data that is used during the execution of the instructions and/or data that is generated during the execution of the program instructions. Various different kinds of programs may be loaded into system memory 2010 including but not limited to client applications, Web browsers, mid-tier applications, relational database management systems (RDBMS), virtual machines, containers, etc.

System memory 2010 may also store an operating system 2016. Examples of operating system 2016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 2000 executes one or more virtual machines, the virtual machines along with their guest operating systems (GOSs) may be loaded into system memory 2010 and executed by one or more processors or cores of processing unit 2004.

System memory 2010 can come in different configurations depending upon the type of computer system 2000. For example, system memory 2010 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 2010 may include a basic input/output system (BIOS) containing basic routines that help to transfer information between elements within computer system 2000, such as during start-up.

Computer-readable storage media 2022 may represent remote, local, fixed, and/or removable storage devices plus storage media for temporarily and/or more permanently containing, storing, computer-readable information for use by computer system 2000 including instructions executable by processing unit 2004 of computer system 2000.

Computer-readable storage media 2022 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 2022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2022 may include, but is not limited to, Zip® drives, flash memory cards, universal serial bus (USB) flash drives, secure digital (SD) cards, DVD disks, digital video tape, and the like. Computer-readable storage media 2022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2000.

Machine-readable instructions executable by one or more processors or cores of processing unit 2004 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 2024 provides an interface to other computer systems and networks. Communications subsystem 2024 serves as an interface for receiving data from and transmitting data to other systems from computer system 2000. For example, communications subsystem 2024 may enable computer system 2000 to connect to one or more devices via the Internet. In some embodiments communications subsystem 2024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2024 can provide wired network connectivity (e.g., Ethernet) in addition to or instead of a wireless interface.

In some embodiments, communications subsystem 2024 may also receive input communication in the form of structured and/or unstructured data feeds 2026, event streams 2028, event updates 2030, and the like on behalf of one or more users who may use computer system 2000.

By way of example, communications subsystem 2024 may be configured to receive data feeds 2026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2024 may also be configured to receive data in the form of continuous data streams, which may include event streams 2028 of real-time events and/or event updates 2030, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2024 may also be configured to output the structured and/or unstructured data feeds 2026, event streams 2028, event updates 2030, and the like to one or more databases that may be in communication with one or more streaming data source computers coupled to computer system 2000.

Computer system 2000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer implemented method comprising:
monitoring, by a cloud defense system, reverse DNS traffic associated with a monitored environment, the reverse DNS (rDNS) traffic comprising a set of one or more reverse DNS resolver requests originating from the monitored environment and a set of one or more responses generated by one or more DNS resolvers in response to the set of one or more reverse DNS resolver requests;
collecting, by the cloud defense system, and storing raw data based upon the monitoring of the reverse DNS traffic, the raw data including data related to the set of one or more reverse DNS resolver requests and the set of one or more responses;
augmenting, by the cloud defense system, the raw data to generate augmented data, wherein augmenting the raw data includes obtaining at least a portion of the augmented data from a registrar based at least in part on the raw data, or includes organizing the raw data across a dimension of the raw data;
identifying, by the cloud defense system, an irregular network activity associated with the monitored environment by determining, based at least in part on the augmented data, that a baseline network activity has been exceeded; and
outputting, by the cloud defense system, a signal indicative of the irregular network activity.

2. The computer implemented method of claim 1, wherein identifying the irregular network activity comprises identifying a portion of the monitored environment that is experiencing the irregular network activity, the portion of the monitored environment comprising one or more components of the monitored environment.

3. The method of claim 2, wherein the one or more components of the monitored environment include at least one of: a virtual cloud network (VCN) within the monitored environment, a region within the monitored environment, a set of one or more VCNs associated with a customer of a cloud service provider, a data center within the monitored environment, a virtual machine and a host machine.

4. The computer implemented method of claim 1, wherein identifying the irregular network activity comprises identifying a source of the irregular network activity.

5. The computer implemented method of claim 4, wherein the source is at least one of: (i) a portion of the monitored environment or (ii) a component external to the monitored environment.

6. The computer implemented method of claim 4, wherein identifying the source comprises performing identifying at least one of: a first IP address associated with the source that triggered at least one reverse DNS request in the set of one or more reverse DNS resolver requests, a first fully qualified domain name (FQDN) associated with the first IP address, or an owner associated with the first FQDN.

7. The computer implemented method of claim 1, further comprising:
initiating, by the cloud defense system, a set of one or more actions responsive to outputting the signal indicative of the irregular network activity.

8. The computer implemented method of claim 7, wherein the set of one or more actions at least perform one of the following: (i) changing a set of rules associated with a component of the cloud defense system, (ii) quarantining a system within a cloud server provider infrastructure (CSPI), and (iii) causing an alert to be generated.

9. The computer implemented method of claim 1, wherein augmenting the raw data includes at least one of: adding information obtained from the registrar, replacing the raw data, or combining rDNS requests from a first virtual cloud network.

10. The computer implemented method of claim 1 wherein the identifying the irregular network activity comprises:
generating a first baseline using prior augmented data, the prior augmented data generated prior to generating the first baseline;
determining a deviation from the first baseline; and
identifying the deviation as the irregular network activity.

11. The computer implemented method of claim 10, wherein:
the first baseline identifies a portion of the monitored environment and a first threshold associated with the portion of the monitored environment; and
determining the deviation comprises determining, based upon the augmented data, that the first threshold associated with the portion has been exceeded.

12. The computer implemented method of claim 11, wherein the first baseline represents a number of rDNS requests within the set of one or more rDNS resolver requests transmitted by the portion of the monitored environment.

13. The computer implemented method of claim 11, wherein the first baseline represents a number of rDNS requests within the set of one or more rDNS resolver requests transmitted by the portion of the monitored environment to resolve a set of one or more IP addresses.

14. The computer implemented method of claim 11, wherein the first baseline is different from a second baseline identifying a second portion of the monitored environment with a second threshold that is different from the first threshold.

15. The computer implemented method of claim 1, wherein the set of one or more reverse DNS resolver requests are generated by one or more VCNs, one or more regions, or one or more virtual machines.

16. The computer implemented method of claim 1, the raw data and an external registrar are used when generating the augmented data.

17. A cloud defense system comprising:
one or more storage media storing instructions;
one or more processors configured to execute the instructions to cause the cloud defense system to;
monitor reverse DNS traffic associated with a monitored environment to obtain raw data, the reverse DNS traffic comprising a set of one or more reverse DNS resolver requests originating from the monitored environment and a set of one or more responses generated by one or more DNS resolvers in response to the set of one or more reverse DNS resolver requests, wherein the raw data includes data related to the set of one or more reverse DNS resolver requests and the set of one or more responses;
generate, using the raw data, augmented data by obtaining at least a portion of the augmented data from a registrar based at least in part on the raw data, or organizing the raw data across a dimension of the raw data;
determine, based at least in part on the augmented data, that a baseline network activity has been exceeded; and
generate, based at least in part on the determination that the baseline network activity has been exceeded, one or more alerts or one or more reports, or identify one or more patterns in the augmented data.

18. The cloud defense system of claim 17, wherein the raw data indicates a virtual network where a reverse DNS resolver request originated, and wherein the processors are further configured to execute the instructions to cause the cloud defense system to identify portions of the monitored environment that are experiencing irregular network activity.

19. The cloud defense system of claim 17, wherein the baseline network activity indicates a first baseline for a first network activity source transmitting traffic to the monitored environment and a second baseline for a second network activity source transmitting traffic to the monitored environment, the second baseline is different than the first baseline.

20. A non-transitory computer-readable medium storing a set of instructions, the set of instructions when executed by one or more processors cause processing to be performed comprising:
monitoring, by a cloud defense system, reverse DNS traffic associated with a monitored environment, the reverse DNS traffic comprising a set of one or more reverse DNS resolver requests originating from the monitored environment and a set of one or more responses generated by one or more DNS resolvers in response to the set of one or more reverse DNS resolver requests;
collecting, by the cloud defense system, and storing raw data based upon the monitoring of the reverse DNS traffic, the raw data including data related to the set of one or more reverse DNS resolver requests and the set of one or more responses;
augmenting, by the cloud defense system, the raw data to generate augmented data, wherein augmenting the raw data includes obtaining at least a portion of the augmented data from a registrar based at least in part on the raw data, or includes organizing the raw data across a dimension of the raw data;
identifying, by the cloud defense system, an irregular network activity associated with the monitored environment by determining, based at least in part on the augmented data, that a baseline network activity has been exceeded; and
outputting, by the cloud defense system, a signal indicative of the irregular network activity.

* * * * *